United States Patent [19]
Ishii et al.

[11] Patent Number: 5,858,571
[45] Date of Patent: Jan. 12, 1999

[54] METHOD OF PRODUCING HYDROGEN ABSORBING ALLOY POWDER, AND ELECTRODE USING HYDROGEN ABSORBING ALLOY POWDER PRODUCED BY SAID METHOD

[75] Inventors: Masatoshi Ishii; Hiroyuki Miyamoto; Yukihiro Kuribayashi; Masanobu Uchida, all of Takefu; Hajime Kitamura; Genji Noguki, both of Ibaraki-ken, all of Japan

[73] Assignee: Shin-Etsu Chemical Co., Ltd., Japan

[21] Appl. No.: 920,883

[22] Filed: Aug. 29, 1997

[30] Foreign Application Priority Data

| Aug. 30, 1996 | [JP] | Japan | 8-249259 |
| Sep. 9, 1996 | [JP] | Japan | 8-261281 |
| Oct. 4, 1996 | [JP] | Japan | 8-283190 |
| Feb. 24, 1997 | [JP] | Japan | 9-055529 |

[51] Int. Cl.$^6$ ............................ H01M 4/26; H01M 10/28
[52] U.S. Cl. ........................... 429/59; 29/623.1; 420/900
[58] Field of Search ................. 429/59, 101, 218; 420/900; 29/623.1

[56] References Cited

U.S. PATENT DOCUMENTS

| 5,554,456 | 9/1996 | Ovshinsky et al. | 429/59 |
| 5,560,752 | 10/1996 | Badding et al. | 29/623.1 |
| 5,688,611 | 11/1997 | Golben | 429/53 |

*Primary Examiner*—Maria Nuzzolillo
*Assistant Examiner*—Carol Chaney
*Attorney, Agent, or Firm*—Millen, White, Zelane & Branigan, P.C.

[57] ABSTRACT

A method of producing a hydrogen absorbing alloy powder, which comprises a step of treating a pulverized hydrogen absorbing alloy with a solution comprising a conjugated unsaturated compound having at least 5 conjugated π bonds and a molecular weight of at least 100 and, prior to the this step, optionally comprises a step of treating a pulverized hydrogen absorbing alloy with a mineral acid or alkali; and an electrode using a hydrogen absorbing alloy powder produced by the aforesaid method.

19 Claims, No Drawings

METHOD OF PRODUCING HYDROGEN ABSORBING ALLOY POWDER, AND ELECTRODE USING HYDROGEN ABSORBING ALLOY POWDER PRODUCED BY SAID METHOD

FIELD OF THE INVENTION

The present invention relates to a hydrogen absorbing alloy powder having excellent keeping quality and, particularly to, a method of producing a hydrogen absorbing alloy powder which, when it is used in the negative electrode of a nickel-hydrogen secondary battery, enables the electrode to have satisfactory initial activity. Further, the invention concerns an electrode using the hydrogen absorbing alloy powder produced by the aforesaid method.

BACKGROUND OF THE INVENTION

Since the alloys capable of absorbing and desorbing hydrogen (which are abbreviated as "hydrogen absorbing alloys" hereinafter) were discovered, they have been applied to not only a hydrogen absorbing means but also a battery and the like. In particular, alkaline secondary batteries utilizing such alloys were already used practically, and the hydrogen absorbing alloys used therein have undergone successive improvements with the intention of heightening the battery capacity and lengthening the battery life.

More specifically, in the hydrogen absorbing alloy having a composition of $LaNi_5$ and a $CaCu_5$ type crystal structure, which was studied at first, it has been tried to partially replace the La by other rare earth elements, such as Ce, Pr and Nd, and the Ni by other metal elements, such as Al, Co and Mn, thereby enabling the secondary battery to have a higher capacity and a longer life.

However, such a replacement in the hydrogen absorbing alloy caused a drop in the initial activity of a secondary battery when the resultant alloy was used for a negative electrode of the battery although it was successful in heightening the battery capacity and lengthening the battery life.

The initial activity of a secondary battery is, in general, expressed in terms of the number of charge-discharge cycles repeated until the battery reaches the maximum capacity, so that the initial activity is considered to be higher the smaller such a number is. Usually, the initial activity is evaluated by the capacity in the first cycle and the number of charge-discharge cycles repeated until the battery reaches the maximum capacity.

When a secondary battery having a low initial activity is sealed hermetically, the balance between positive and negative electrodes is lost to decrease the battery capacity and the battery life.

In order to solve the aforementioned problem, it has so far been carried out to treat hydrogen absorbing alloys with acids or alkalis. However, these treatments have defects that not only the alloy is subject to surface oxidation during treatment but also the treated alloy is liable to oxidation upon drying and storage, so that they are insufficient in the ease of the handling and cannot ensure sufficient stability in the treated alloy.

SUMMARY OF THE INVENTION

In order to obviate the foregoing defects, the present inventors have made intensive studies of hydrogen absorbing alloy powders for the negative electrode of a secondary battery and methods of producing them. As a result thereof, it has been found that a hydrogen absorbing alloy powder having excellent keeping quality and easiness of handling can be produced simply by treating a pulverized hydrogen absorbing alloy with a solution comprising an unsaturated compound having at least 5 conjugated $\pi$ bonds and a molecular weight of at least 100 (which is called "an unsaturated compound having a high degree of conjugation" hereinafter) and, when the hydrogen absorbing alloy powder which has undergone the aforesaid treatment is used for the negative electrode of a nickel hydride secondary battery, the initial activity of the battery can be elevated without lowering of battery capacity and battery life, thereby achieving the present invention.

Therefore, a first object of the present invention is to provide a method of producing a hydrogen absorbing alloy powder having excellent keeping quality and easiness of handling.

A second object of the present invention is to provide a negative electrode used for a nickel hydride secondary battery having an excellent initial activity.

The aforementioned objects of the present invention are attained by a method of producing a hydrogen absorbing alloy powder, which comprises a step of treating a pulverized hydrogen absorbing alloy with a solution comprising a conjugated unsaturated compound having at least 5 conjugated a bonds and a molecular weight of at least 100.

DETAILED DESCRIPTION OF THE INVENTION

The hydrogen absorbing alloy used in the present invention has no particular restriction, but it can be selected properly from hydrogen absorbing alloys known to be usable for negative electrodes. In particular, the use of a hydrogen absorbing alloy basically having a composition of $MmNi_5$ is appropriate from the viewpoint of ensuring a satisfactory cycle life in the secondary battery. The symbol Mm in the foregoing composition is referred to as "a Mish metal", or a mixture of rare earth elements including La, Ce, Pr, Nd and the like. Also, a hydrogen absorbing alloy having a composition represented by $(La)_x R_{1-x}(NiM)_y$, wherein R is Ce, Pr, Nd or a mixture of two or more thereof, N is at least one metallic element selected from a group consisting of Mn, Al, Co, Ti, Fe and Zr, x is from 0.2 to 1 and y is from 4.0 to 6.0, are used to advantage in the present invention. In view of further improvement in cycle life, it is preferable to use the $MmNi_5$ hydrogen absorbing alloys in which the nickel is partially replaced by not only Mn but also Al, and further by Co.

In the present invention, for the purpose of producing a hydrogen absorbing alloy powder which can have high keeping quality and easiness of handling and further can ensure a satisfactory initial activity in a secondary battery when it is used for the negative electrode thereof, a pulverized hydrogen absorbing alloy is treated with a solution comprising an unsaturated compound having a high degree of conjugation. This treatment is generally carried out at a temperature of from ordinary temperature to 100° C., and it may be performed under a pressure of 10 kgf/cm² or below in an airtight vessel, if desired. The treatment performed under a high temperature or while cooling is undesirable in view of economy, because it entails too high cost of equipments and facilities for the production in an industrial scale. In particular, the treatment carried out while cooling is impractical, because the treatment time becomes too long.

The treatment time is preferably chosen from the range of 10 minutes to 10 hours, and adjusted properly depending on the treatment temperature. In other words, the treatment time is shortened when the treatment temperature is high; while it is lengthened when the treatment temperature is low.

With respect to the concentration of an unsaturated compound having a high degree of conjugation in a treating bath, it is desirable that the unsaturated compound be present in the bath in a proportion of from about 0.01 to 10 weight % to the hydrogen absorbing alloy to be treated therewith.

The unsaturated compound having a high degree of conjugation which can be used in the present treatment is an aromatic or heterocyclic compound having at least 5 conjugated π bonds per molecule. The expression "a conjugated π bond" used herein is intended to include at least two double bonds and/or triple bonds in conjugation with each another.

The molecular weight of an unsaturated compound having a high degree of conjugation is required to be at least 100, preferably at least 200, in the present invention.

As for the aromatic compound having at least 5 conjugated π bonds which can be used in the present invention, benzene derivatives, naphthalene derivatives, polynuclear aromatic compounds, quinones and nonbenzenoid aromatic compounds are included therein. And, as for the heterocyclic compound having at least 5 conjugated π bonds which can be used in the present invention, oxygen-containing heterocyclic compound, nitrogen-containing heterocyclic compounds, sulfur-containing heterocyclic compounds, bicyclic compounds having a nitrogen in common, and alkaloids are included therein.

In the first place, specific examples of an aromatic compound having at least 5 conjugated π bonds are enumerated below.

With respect to the benzene derivatives, the following are examples thereof:

phenoles and derivatives thereof, such as 2,6-ditertbutylphenylphenol, catecholphthalein, 2,2-diphenylolpropane, 3,7-dihydroxy-10-methylxanthene, phenolphthalein, 7-hydroxy-2,4-dimethylbenzopyrooxonium chloride, hydroxyanthraquinone, purpurogallin, Gallein, diphenylether, α-methoxyphenazine, chloroglucide, 2,3-dihydroxyanthraquinone, 5,7-dihydroxy-4-methylcoumarine, dihydroxyacridone, salicylic acid, α-Hydrindone, β-phenylbutyrophenyl, N-2,4-dinitrophenyl-N-phenylhydroxylamine, acetophenone, 1-(4-nitrophenyl)-3,5-dimethylpyrazole and 9,10-diphenylphenanthrene;

aromatic amines and derivatives thereof, such as N-phenyl-p-benzoquinonediimine, quinoline, Safranine B, Rosaniline, Indurine Sprit Soluble, Aniline Black, Para-Rosaniline, Methyl Violet, Methyl Orange, Methyl Red, Indigo, carbazole, Methylene Blue, o-phenanthroline, p-phenanthroline, 3,6-diaminoacridine, Indanthrene Scarlet 2G, 4-aminodiphenylamine, Acridine Yellow, 3-aminophenothiazine, N'-diphenyl-p-phenylenediamine, Rhodamine, 7-amino-4-methylcoumarine, 2-aminophenazine, phenothiazine, diphenylamine, N-methyldiphenylamine, N-phenyltolylamine, ditolylamine, 2-hydroxy-4-methylquinoline, Hansa Yellow G, N,N'-diphenylformamidine, phenanthrophenazine, Bismarck Brown G, 2,3-diaminophenazine, 2-aminodiphenylamine, Chrysodine R, 2,3,7,8-tetraaminophenazine, aminophenoxazone, hydroxyphenoxazone, triphenedioxa-zine, 2,4-dinitrophenoxazinen and 2',4'-dinitro-4-hydroxy-3-amino-phenylamine;

nitro and nitroso derivatives, such as p-nitrosodiphenylhydroxylamine, phenazine, phenazine oxide, 1-phenylazo-2-naphthol, triphenedioxadine, 4-nitroxanthone and 4'-nitroso-2-nitrodiphenylamine;

phenylhydroxylamine derivatives, such as 4,4'-dinitrodiphenylamine, oxalic acid bis(β-phenylhydrazine), maloic acid bis(β-phenylhydrazine), succinic acid bis(β-phenylhydrazine) and phthalic acid bis(β-Phenylhydrazine);

aromatic halides, such as biphenyl chloride:

aromatic aldehydes, such as 2-phenyl-1-benzylbenzimidazole, Leucomalachite green, Malachite Green, tetrachlorohydroquinone monobenzoate, benzoflavin, 2-phenylbenzthiazole, 4-benzhydrylbenzaldehyde and bisphenylhydrazone, bis(4-nitrophenylhydrazone);

aromatic ketones such as triphenylisooxazole, benzophenone potassium, 4-methylbenzophenone, p-toluyl acid anilide, benzoic acid toluidide, duryl phenyl keton, 2,4,2',4'-tetramethylbenzophenone and calchonphenylhydrazone, 1,3,5-triphenylpyrazoline, dinitrobenzyl:

benzoic acids, phthalic acids and derivatives thereof, such as quinizaline and nitrodiphenylether;

benzene derivatives having further one substituent other than aldehyde group, such as disalicylaldehyde, coumarine, 2-benzoylcoumarone, 1-hydroxy-2,4-dimethylfluorone, 3-phenylcoumarone, ethyl coumarine-3-carboxylate, 3-acetylcoumarine, hydrovaniloin, 4-hydroxy-3-methoxy-ω-nitrostyrene, α-(nitrophenyl)-β-benzoyleethyleneoxide, dinitrophenylindazole, 5-chloro-3-(4-hydroxyphenyl)anthranyl, 3-nitroacridone, 6-nitro-3-phenylanthranyl, 2,8-dimethyl-1,9-anthrazoline, carbostyril, 1,3-dihydroxyacridine, hydroxyquinacdine, Phlorchinyl, 2-methylquinazoline, 3-acetyl-2-methylquinoline, 2-hydroxy-3-phenylquinoline, 3-nitroquinoline and quinoline-2,3-dicarboxylic acid ester;

benzene derivatives having further one substituent other than acyl group, such as 7-hydroxyflavanone, 7-hydroxyflavone, 7,8-dihydroxyflavone, 7-acetoxy-4-methyl-3-phenylcoumarine, 7,8-diacetoxy-4-methyl-3-phenylcoumarine, o-hydroxybenzophenone, xanthone, 2-phenylbenzooxazole, m-hydroxybenzophenone, p-hydroxybenzophenone, 2-benzoylxanthone, 2,4-dihydroxybenzophenone, 2,5-dihydroxybenzophenone, 2,2'-dihydroxybenzophenone, xanthene, aurin, trihydroxybenzophenone, 6,7-dimethoxy-3-phenylcoumarone, o-nitrobenzophenone, m-nitrobenzophenone, 4,4'-dibenzoylazoxybenzene, 2-(2-aminophenyl)-4-methylquinone, 2-hydroxy-4-methylquinone, acridone, 2,4-dimethylquinazoline, 3-cyan-2-hydroxy-4-methylquinoline, flourene, anhydro(2-aminobenzophenone) dimer, 2-hydroxy-3-phenylindazole, 3-phenylindazole, 2-phenylbenzimidazole, 2-methyl-8-benzoylquinoline, 2-methyl-4-phenylquinoline, 4-phenyl-2-quinazolone, aminobenzophenone, chlorobenzophenone, 4-phenylbenzo-1,2,3- triazine-3-oxide, diaminobenzophenone, 7-methyl-3-phenyl-4,5-benzo-1,2,6-oxydiazine, 4,4'-bisdimethylaminobenzophenone, 4,4'-bisdimethylaminobenzophenoneimide, 2,4-dinitro-9-phenylacridine and 4,4'-dibenzoyldiphenyl;

Benzene or toluene derivatives having three or more different substituents, such as tetramethoxyindigo, 5,6,5',6'-bis-methylenedioxyindigo, 7-acetoxy-8-methoxy-3-(2-nitrophenyl)carbostyril, 2,2'-dinitrodiphenyldisulfide-4,4'-dialdehyde, 6-chloro-3-benzoylflavone and 1,3,8-trinitrophenoxazine;

aralkyl compounds, such as 9-benzylacridine;

diazo compounds and azo compounds, such as azobenzene, azotoluene, 2,2-dimethoxyazobenzene, 4,4'-dichloroazobenzene, 1,1'-azonaphthalene, 2,2'-dihydroxyazobenzene, 2,2'-dihydroxy-5,5'-dimethylazobenzene, p-bromoazobenzene, p-nitroazobenzene and phenoazoxide;

aromatic unsaturated compounds, such as 2,3,4,5-tetraphenylcyclopentane-2-ene-1-one, 1,2,3-triphenylazulene, 2,2'-dimethyldiphenylacetylene, 4,4'-diethyldiphenylacethylene, 3,4,3',4'-tetramethyldiphenylacetylene, 2,2'-dichlorodiphenylacetylene, 2,2'-dibromodiphenylacetylene, 2-nitrodiphenylacetylene, 2,2'-dinitrodiphenylacetylene, 2,2'-diaminodiphenylacetylene, 2,2'-dimethoxydiphenylacetylene, stilbene, α-methylstilbene, α-ethylstilbene, α,β-dimethylstilbene, α,β-diethylstilbene, α,β-dichlorostilbene, αβ-dibromostilbene, 2-chlorostilbene, 4.4'-diiodostilbene, α-nitrostilbene, α,β-dinitrostilbene, 2,4,6-trinitrostilbene, 2-aminostilbene, 2,2'-diaminostilbene, 4,4'-di(dimethylamino)-stilbene, 2,2'-dicyanostilbene, 2-hydroxystilbene, 2-methoxystilbene, 2,2'-dihydroxystilbene, 2,2'-dimethoxystilbene, 4,4'-dialkoxystilbene and 3,5,2',4'-tetrahydroxystilbene; and polyphenyls and derivatives thereof, such as biphenyl, terphenyl, quaterphenyl, quinquiphenyl, sexiphenyl, septiphenyl, octiphenyl, noviphenyl and deciphenyl.

With respect to the naphthalene derivatives, the following are examples thereof:

alkyl, alkenyl and phenylnaphthalenes, such as 1-methylnaphthalene, 2-methylnaphthalene, 1-ethylnaphthalene, 2-ethylnaphthalene, 1,2-dimethylnaphthalene, 1,4-dimethylnaphthalene, 1,5-dimethylnaphthalene, 1,6-dimethylnaphthalene, 1,7-dimethylnaphthalene, 2,3-dimethylnaphthalene, 2,6-dimethylnaphthalene, 2,7-dimethylnaphthalene, 1-propylnaphthalene, 1-isopropylnaphthalene, 2-isopropylnaphthalene, trimethylnaphthalene, diisopropylnaphthalene, 1-vinylnaphthalene, 2-vinylnaphthalene, 1-propenylnaphthalene, 1-allylnaphthalene, 1-isopropenylnaphthalene, 2-isopropenylnaphthalene, 2-isopropenylnaphthalene, 1-phenylnaphthalene, 2-phenylnaphthalene, 1,4-diphenylnaphthalene and 1,2,4-triphenylnaphthalene;

dinaphthyls, such as 1,1'-dinaphthyl, 1,2'-dinaphthyl and 2,2'-dinaphthyl;

naphthylarylmethanes, such as 1-benzylnaphthalene, 2-benzylnaphthalene, 1-(α-chlorobenzyl)naphthalene, 1-(α,α-di-chlorobenzyl)naphthalene, diphenyl-α-naphthylmethane, diphenyl-,β-naphthylmethane, 1,8-dibenzylnaphthalene, di-α-naphthylmethane, α-naphthyl-β-naphthylmethane, di-β-naphthylmethane;

naphthylarylethanes, such as 1-phenethylnaphthalene, 1,2-di-α-naphthylethane, 1,2-di-β-Naphthylethane and 1,1-α-dinaphthylethane;

hydronaphthalenes, such as 1,2-dihydronaphthalene, 1,4-dihydronaphthalene and 1,2,3,4-tetrahydronaphthalene;

nitronaphthalenes and derivatives thereof, such as dinaphthopyridazine, 7,8-benzoquinone, 5,6-benzoquinone, naphthazarine, diperimidine, nitromethylnaphthalene, nitroalkylnaphthalene, nitrophenylnaphthalene, halo-nitronaphthalene, halo-dinitronaphthalene, nitrosonaphthalene, dinitrotetraline, dibenzophenazine, methylbenzoindole, 9-chloro-1-azaanthracene, quinolinoquinoline, 1,2,3-triazaphenarene, perimidone, perimidine, dibenzoacridine, benzophenazine=12-oxide, doaminonaphthalene, triaminonaphthalene, tetraaminonaphthalene, N-ethyl-α-naphthylamine, N-methylnaphthyl aminie, N,N-dimethylnaphthylamine, N-methyl-N-ethylnaphthylamine, trimethylnaphthylamine ammonium salt, N-phenylnaphthylamine, N-benzylnaphthylamine, N-naphthyl-ethylenediamine, N-naphthylglycine, N-β-cyanomethylnaphthylamine, N-acetylnaphthylamine, N-formylnaphthylamine, N-benzoylnaphthylamine, N-phthaloylnaphthylamine, aminomethylnaphthalene, nitronaphthylamine, dinitronaphthylamine, halonitronaphthylamine, aminotetraline and diaminotetraline;

halogenated naphthalenes, such as 1-fluoronaphthalene, 1-chloronaphthalene, 1-chloro-3,4-dihydronaphthalene, 1-iodonaphthlene, 1-bromonaphthalene, 1-chloro-4-chloromethylnaphthalene, 1-bromo-2-bromomethylnaphthalene, 1,4-difluoronaphthalene, 1,2-dichloronaphthalene, 1,7-dichloronaphthalene, 1,5-dichloronaphthalene, 1,8-dichloronaphthalene, 2,3-dichloronaphthalene, 1,4-dibromonaphthalene, 1,7-diiodonaphthalene, perylene, 1,2,3-trichloronaphthalene, 1,2,4-tribromonaphthalene, 1,2,3,4-tetrachloronaphthalene, 1,4,5-tribromo-3,8-dimethylnaphthalene, 1,3,6,7-tetrachloronaphthalene, 1,3,5,8-tetrabromonaphthalene and 1,2,3,4,5-pentachloronaphthalene;

naphthylhydroxylamines, naphthylpyrazines and naphthylureas, such as α-naphthylhydroxylamine, N'-phenyl-N -α-naphthyl-N-oxyurea, β-naphthylthiohydroxylamine, N-nitroso-α-naphthylhydroxylamine, Neocupferron, 2-hydroxy-1, 1'azonaphthalene, α-Naphthylhydrazine, 1,2-dibenzocarbazole, 4,4-diamino-1,1'-binaphthyl, 3,4-benzocarbazole, 2,2'-diamino-1,1'-binaphthyl, N'-acetyl-N-β-naphthylhydrazine, N'-lauroyl-N-β-naphthylhydrazine, N'-phenyl-N-α-naphthylhydrazine, n'-(2,4-dinitrophenyl)-N-α-naphthylhydrazine, 2-α-naphthyl-5-nitrobenztriazole, N,N'-di-α-naphthylhydrazine, 1,1'-diamino-2,2'-binaphthyl, N,N'-di-5-tetralylhydrazine, N'-(2,4-dinitrophenyl)-N-β-naphthylhydrazine, 2-β-naphthyl-5-nitrobenztriazole, N'-triphenylmethyl-N-β-naphthylhydrazine, N,N'-di-β-naphthylhydrazine, N-methyl-N-(2,4-dinitro-1- naphthyl)-hydrazine, 2-amino-(naphtho-2',1':4,5-thiazole), 1,2:5,6-dibenzophenazine, 2-amino-(napto-2',1':4,5-thiazole), 2,3-dihydrazinonaphthalene, 2-phenyl-1,3-bisbenzylidenamino(naphtho-2',3':4,5-imidazoline), N-acetyl-α-naphthylnitrosoamine, N-ethyl-α-naphthylnitrosoamine, N-phenyl-α-naphthylnitrosoamine, α,α'-dinaphthylnitrosoamine, succinic acid bis(β-naphthylnitrosoamide), N-ethyl-β-naphthylnitrosoamine, N-phenyl-β-naphthylnitrosoamine, N-acetyl-2-methyl-1-naphthylnitrosoamine, 4,5-benzindazole, naphthylnitrosoamine, 1-nitro-2-naphthylamine, α-naphthylurea, N,N'-di-α-naphthylurea, 4-chloro-1-naphthylcarbamoylchloride, 2,4-dichloro[naptho-1',2':4,5-thiazole], 2-mercapto[naphtho-1',2':4,5-thiazole], 2-chloro[naptho-1',2';4,5-thiazole], 2-mercapto[naptho-2',1':4,5-thiazole] and 2-chloro[naptho-2',1':4,5-thiazole];

naphthalene type aralkyl compounds, such as dibenzoanthracene, acenaphthene, α-chloroethylnaphthalene, phenylnaphthylchloromethane, diphenylnaphthylchloromethane, nitromethylnaphthalene, aminomethylnaphthalene, (naphthylmethyl)amine, α-phenyl(naphthylmethyl)amine, N-benzyl(naphthylmethyl)amine, trimethyl(naphthylmethyl)ammonium salt, tri(naphthylmethyl)amine, di(naphthylmethyl)amine, (β-naphthylethyl)alcohol, dimethylnaphthylcarbinol, phenylnaphthylcarbinol, diphenylnaphthylcarbinol, 9-phenylbenzofluorene, naphthylpropyleneoxide, ethyl(naphthylmethyl)ether, phenyl(napthylmethyl)ether, naphthylacetone, ω-naphthylacetophenone, acenaphthenone, dihydrophenarone, phenarone, benzoindanone, naphthylacetonitrile, 9,9'-dichlorodibenzofluorene, α-nitro-β-naphthylethylene, γ-naphthylallyl alcohol, β-naphthylacrolein, methyl(β-Naphthylvinyl)ketone and naphthylphenanthrene dicarboxylic acid anhydride;

Naphthols and naphthalenesulfonic acids, such as 9-hydroxynaphthacenequinone, 2'-naphthalene-2-indoleindigo, 1-methoxynaphthalene, 1-ethoxynaphthalene, 1-phenoxynaphthalene, α-naptholsalicylic acid ester, β-naphthol, α-naphthol, α-naphtholbenzoic acid ester, α-naphtholacetic acid ester, phenyl-β-hydroxynaphthylbenzaliminomethane, β-naphtholphenylmethylamine, methylene-di-β-naphthol, dinapthopyrane, 1'-naphthol-2-indoleindigo, 2-methoxynaphthalene, 2-ethoxynaphthalene, N-p-hydroxyphenyl-2-naphthylamine base, β-naphthosalicylic acid ester, 2-methyl-1-naphthol, 1,2-napthamethylenequinone, 1,2-dihydroxynaphthalene, naphthaleneindoleindigo, α,β-naphthophenoxazine, β,γ-naphthophenoxazine, 4-hydroxy-10-methyl-1',2'-benzocarbazole, dihydroxynapthofluorane, dinaphthoquinone, 2,6-naphthoquinone, hydroxybenzoacridine, 9-hydroxy-3-dimethylaminonaphthophenoxazine, 1,2,4-trihydroxynapthalene, 1,4,5,6-tetrahydroxynaphthalene, thio-α-naphthol, 4-mercapto-1-naphthol, 1,5-naphthalenedithiol, methyl-α-naphthyl sulfide, 1,1'-naphthyl sulfide, 1,1'-thiodi-2-napthol, 1,1'-naphthyl disulfide, 1,1'-thiodi-1-naphthol, thio-β-Naphthol, naphthothioindigo, 1-amino-2-naphthalenethiol, naphthothianthrene and 2-mercapto-1,2-napthothiazole;

napthoaldehydes and derivatives thereof, such as α-naptholaldehyde, 2-(2,4-dinitrophenyl)-1-(αnaphthyl)ethylene, 2-methyl-1-naphthoaldehyde, 2,3-dimethyl-1-naphthoaldehyde, 4-bromo-1-naphthoaldehyde, 4-nitro-1-naphthoaldehyde, 2,4-dinitro-1-naphthoaldehyde, 4-amino-1-naphthoaldehyde, 2-hydroxy-1-naphthoaldehyde, 1-naphthalene-2'-indoleindigo, 1,2-bis(2-hydroxy-1-naphthyl)ethylene, 1,2:7,8-dibenzoxanthilium chloride, 2-hydroxy-1-naphthylethynyl pyrylium salt, 5,6-benzocoumarin, bis(2-methyl-3-indolyl)(2-hydroxy-1-naphthyl)methane, 4,5-benz-indoxazene, 2-acetoxy-1-naphthonitrile, 4-methoxy-1-naphthoaldehyde, 1,4-bis(4-methoxy-1-naphthyl)-1,3-butadiene, 2-naphthalene-2'-indoleindigo, 3-acetyl-6,7-benzocoumarin, 4-chloro-1-hydroxy-2-naphthoaldehyde, haphthalenedialdehyde, 5-hydroxy-2-naphthaleneindoleindigo, 5,6,7,8-tetrahydro-2-naphthoaldehyde, imide chloride, naphthoamide, naphthoanilide, naphthonitrile, ethyl β-naphthoimidate, β-naphthamidine, α-naphthoamidoxime, α-naphthohydrazide, naphthostyryl, hydroxynaphthonitrile, 1,2:7,8-dibenzoxanthone, 1,2-benzoxantjone, 1,1'-binaphthylene-2,8:8,2'-dioxide, 2,3:6,7-dibenzoxanthone, 3-hydroxy-2-naphthoanilide, 1,3-bis(3-hydroxy-2-naphthoyloxy)benzene, 2,4-dihydroxyphenyl-3-hydroxy-2-naphthyl ketone, 4-arylazo-3-hydroxy-2-naphthoanilide, 3,4-dihydronaphthalene-1,2-dicarboxylic acid anhydride, 2-aminonaphthalimide, naphthalohydrazide, α-pyridonaphthalone and N-methylnaphthalimide; and acetonaphthenes, benzoylnaphthenes, such as 1,2:5,6-dibenzanthracene, 2'-methyl-2,1'-dinaphthyl ketone, 2-methyl-1,1'-dinaphthyl ketone, styryl-2-naphthyl ketone, β-naphthoyl acetone, β-naphthoyl acetophenone, 1-(β-naphthyl)-1-chloroethylene, 2-[tris(β-cyanoethyl)acetyl]naphthalene, 1,3,5-tri(β-naphthyl)benzene, dimethyl-2-naphthylcarbinol, 4,5:4',5'-dibenzothioindigo, styryl-1-naphthyl ketone, β-acetonaphthone, β-propionylnaphthalene, 1-butylnaphthalene, 1-isobutyl-naphthalene, 1-stearoylnaphthalene, 1-benzoyl-naphthalene, 1-o-toluylnaphthalene, p-biphenyl-1-naphthyl ketone, 1,2,5,6-dibenzanthracene, 1-acetyl-3,4-dihydronaphthalene, 1-acetyl-7-bromonaphthalene, 1-aminoacetylnaphthalene, 2-aminobenzoylnaphthalene, 1-acetyl-2-hydroxynaphthalene, 1-acetyl-2-methoxynaphthalene, 1-acetyl-4-ethoxynaphthalene, 2-cinnamoyl-1-naphthol, 7,8-benzochromone, 3-acetyl-2-methyl-7,8-benzochromone, 3-acetyl-2-methyl-7,8-benzochromone, 3,4-dimethyl-7,8-benzocoumarine, 4-methyl-3-phenyl-7,8-benzocoumarine, 1-benzoyl-2-hydroxynaphthalene, 4-hydroxybenzanthrone, 4-benzoyl-1-naphthol, 3-hydroxy-1,2-benzofluorenone, 2-acetyl-4-chloro-1-hydroxynaphthalene, α-naphthylglyoxal, β-naphthylglyoxal, 1,4-dibenzoylnaphthalene and phenyl-4-methyl-1-naphthydiketone.

With respect to the polynuclear aromatic compounds, the following are examples thereof:

anthracenes and derivatives thereof, such as anthracene, 1,2-dihydroanthracene, 1-chloroanthracene, 1,4-dichloroanthracene, 1,2,7-trichloroanthracene, 1,2,3,4-tetrachloroanthracene, 1-nitroanthracene, 9,10-dinitroanthracene, 1-aminoanthracene, 2-dimethylaminoanthracene, 2-anilinoanthracene, 9-methylaminoanthracene, 1,4-diaminoanthracene, 1-hydroxyanthracene, 9,10-dihydroanthrol, 10-methylanthranol, 10-phenylanthranol, 10-nitroanthranol, 2-amino-1-anthranole, 1,2-dihydroxyanthracene, 9,10-dihydroxyanthracene diacetate, 1-methylanthracene, 4-chloro-1-methylanthracene, 1,5-dichloro-2-methylanthracene, 9-ethylanthracene, 9-vinylanthracene, 9-propylanthracene, 9-isopropylanthracene, 9-butylanthracene, 9-isobutylanthracene, 9-isoamylanthracene, 1,3-dimethylanthracene, 9,10-diethylanthracene, 1-phenylanthracene, 9-phenylanthracene, 1,5-dichloro-9-phenylanthracene, 10-nitro-9-phenylanthracene, 9-benzylanthracene, 1-benzhydrylanthracene, 9,10-diphenylanthracene, 9,10-dibenzylanthracene, 9,10-diphenyl-9,10-dihydroanthracene, 1-(β-naphthyl)anthracene, 9-(α-naphthyl)-10-phenylanthracene, 9,10-di (α-naphthyl) anthracene, 1,1'-bianthryl, 2,2'-bianthryl, 9,9'-bianthryl, anthracene-9-aldehyde, 1-acetylanthracene, 9-benzoylanthracene, 10-nitroanthraphenone, 9,10-dibenzoylanthracene, anthrone, 9-mercaptoanthracene, 9,10-disodium-9,10-dihydroanthracene, 10-bromo-9-anthrylmagnesium bromide and anthrylmercury chloride;

phenanthrenes and derivatives thereof, such as phenanthrene, 9,10-dihydrophenanthrene, 1,2,3,4-tetrahydrophenanthrene, 1-chlorophenanthrene, phenanthrene-9,10-dichloride, 1-bromophenanthrene, 1-iodophenanthrene, 9-(chloromethyl)phenanthrene, 1-(bromomethyl)phenanthrene, 4,5-bis(bromomethyl) phenanthrene, 1-nitrophenanthrene, 10-bromo-9-nitrophenanthrene, 1-aminophenanthrene, 9,10-diaminophenanthrene, 9,9'-azoxyphenanthrene, 9,9'-azophenanthrene, 1-hydroxyphenanthrene, cholesterol, estrone, androsterone, 10-bromo-9-phenanthrol, 9-nitro-3-phenanthrol, 4-amino-1-phenanthrol, 10-benzoazo-9-phenanthrol, 1,2-dihydroxyphenanthrene, retene-3,8-diol, 2,3,5,6-tetrahydroxyphenanthrene, 1-methylphenanthrene, 1-ethylphenanthrene, 1-vinylphenanthrene, 1,2-dimethylphenanthrene, 9,10-diethylphenanthrene, 9,10-dipropylphenanthrene, 2-ethyl-1-methylphenanthrene, 7-isopropyl-1-methylphenanthrene, 9,10-dihydroretene, aminoretene, 3-acetoaminoretene, 6-acylaminoretene, 9-phenylphenanthrene, 9-benzylphenanthrene, 1-(α-naphthyl)phenanthrene, 1,1'-bi-phenanthryl, 9,9-biphenanthryl, 1-phenanthraldehyde, 2-phenanthraldehyde, 9-phenanthraldehyde, 1-acetylphenanthrene, 2-propionylphenanthrene, 3-acetylretene and 1-benzoylphenanthrene;

phenanthrenequinones, such as phenanthrene-1,2-quinone, phenanthrene-1,4-quinone, phenanthrene-3,4-quinone, phenanthrene-9,10-quinone, 2-phenyl-3-acetoxy-4,5-biphenylfuran, 7-isopropyl-1-methylphenanthrenequinone, 1-chlorophenanthrenequinone, 2-bromophenanthrenequinone, 2-iodophenanthrenequinone, 2,7-dibromophenanthrenequinone, 2-nitrophenanthrenequinone, 2,5-dinitrophenanthrenequinone, 2-aminophenanthrenequinone, 2,7-diaminophenanthrenequinone, 3,6-diaminophenanthrenequinone, 2,5-diaminophenanthrenequinone, 2-hydroxyphenanthrene-1,4-quinone, 3-hydroxyphenanthrenequinone, 2-hydroxyretenequinone, 3-hydroxyretenequinone, 6-hydroxyretenequinone, 2-hydroxy-3,4-dinitrophenanthrenequinone and 2-amino-3-hydroxyphenanthrenequinone; and other polynuclear aromatic compounds and derivatives thereof, such as pentacene, hexacene, benzophenanthrene, benzo[a]anthracene, naptho[2,1,a] pyrene, dibenzo[a,j]-anthracene, pyrene, coronene, 1,12-benzoperylene, overene, dibenzoanthracene, naphthacene, Terramycin, Auremycin, rubrene, o-toluoyl-1-naphthalene, benzoanthraquinone, 5,6-dihydroxy- 5,6-dihydrobenzoanthracene, chrysene, triphenylene, dibenzonaphthacene, hexahydropyrene, perylene, 3,9-dichloroperylene, tetrachloroperylene, 3,9-dibromoperylene, 3,10-dinitroperylene, 4,6-dibenzoyl-1,3-dimethylbenzene, 6,13-dihydropentacene, naptho[2,3-a]anthracene, dispirane, dibenzo[a,h]anthracene, picene, picyleneketone, picene-5,6-quinone, dibenzo[c,g]phenanthrene, benzo [a]pyrene, benzo[a]pyrene-1,6-quinone, mesobenzoanthrone pericarboxylic acid anhydride, anthraceno[2,1-a]anthracene, dibenzo[a,1]naphthacene, phenanthrene [2,3-a]anthracene, naphtho[2,3-a]pyrene, dibenzo-[a,h] pyrene, dibenzo[a,1]pyrene, zethrene, anthanthrene, benzo[1,12]perylene, heptacene, tetrabenzo[a,c,h,j] anthracene, tribenzo[a,I,1]pyrene, tetrahydrodimethyldinaphthyl, mesonaphthodianthrene, mesoanthrodianthrene and 2,3:8,9-dibenzocoronene, pyranthrene.

With respect to the quinones and their derivatives, the following are examples thereof:

benzoquinones and derivatives thereof, such as dibenzoquinoyl disulfide, 2,5-bis(phenylthio)-p-benzoquinone, bibenzoquinone, bitoluquinone, phoenicin, Oosporein, indophenol, indoaniline, Hydron Blue, indamine, Meldra's Blue, Wurster's Blue, Wurster's Red, 4,4'-diphenoquinone, 4,4,'-stilbenequinone, 3,5,3',5'-tetramethyl-4,4'-diphenoquinone, 3,5,3',5'-tetra-tert-butyl-4,4'-diphenoquinone, 3,5,3',5'-tetramethyl-4,4'-stilbenequinone and 3,5,3',5'-tetra-tert-butyl-4,4'-stilbenequinone;

naphthoquinones and derivatives thereof, such as 1,2-naphthoquinone, 3-hydroxy-2,2'-binaphthyl-1,4:3',4'-diquinone, 5,6-benzoquinoxaline, 1,2-benzophenazine, 2-benzoazo-1-naphthol, 4-(2,4-dihydroxyphenyl)-1,2-dihydroxynaphthalene, 4-(3,4,5-trihydroxyphenyl)-1, 2-dihydroxynaphthalene, 1,2-naphthoquinone-1-phenylimide, 1,2-benzophenoxazine, 1,2-naphthoquinone-2-chloroimide, 1,2-napthoquinone-bischloroimide, 2-anilino-1,4-naphthoquinone-4-anil, 2-hydroxy-1,4-naphthoquinone-4-anil, 1,2-naphthoquinone-1-oxime benzoate, 1,2-naphthoquinone-1-oxime methyl ether, 1-nitroso-2-naphthol, 2-nitroso-1-naphthol, naptho[1',2':3,4] furazane, 1,2-naphthoquinone-2-oxime benzoate, 1,2-naphthoquinone-2-oxime methyl ether, 3-anilino-1,2:8, 9-dibenzophenazine, Naphthyl Blue, Naphthyl Violet, 1,2:5,6-dibenzophenazine, naptho[1',2':3,4]furazane-2-oxide, triphthaloylbenzene, hexahydroxynaphthalene anhydride, 2,2'-binaphthyl-1,4:1',4'-diquinone, 1',4'-dihydroxynaphtho-(2',3':3,4)pyrazole, 4,7-dihydroxy-3,3-diphenyl-5,6-benzindiazene, 2-diphenylmethyl-1, 4-naphthoquinone, methylnaphtho-[2',3':4,5]triazole-1',4'-quinone, 1,2,4-triacetoxynaphthalene, 1,4-naphthoquinonephenylimide, 1,4-naphthoquinonemono-(p-dimethylaminoanil), 1,4- naphthoquinonealkylimide, 4-nitroso-1-naphthol, phenylcarbamate, 4-nitroso-1-naphthyl-amine, 4-benzhydryl-1,2-naphthoquinone, 2-benzhydryl-1,4-naphthoquinone, 3-benzhydryl-2-methyl-1,4-naphthoquinone, 3-geranyl-2-methyl-1,4-naphthoquinone, 3-farnesyl-2-methyl-1,4-naphthoquinone, 2-methyl-3-phytyl-1,4-naphthoquinone, Vitamine K1, Vitamine K2, 3-allyl-2,6-dimethyl-1,4-naphthoquinone, 2,6-dimethyl-3-phytyl-1,4-naphthoquinone, 2,3-diallyl-6,7-dimethyl-1,4-naphthoquinone, 2-phenyl-1,4-naphthoquinone, 2-methyl-1,4-naphthoquinone, 2,6-dimethyl-3-phenyl-1,4-naphthoquinone, 3-benzyl-2-methyl-1,4-naphthoquinone, 2-methyl-3-(β-phenylethyl)-1,4-naphthoquinone, 3-cinnamyl-2-methyl-1,4-naphthoquinone, 2-benzhydryl-1,4-naphthoquinone, 4,7-diketo-8-diphenylmethyl-4,7,8,9-tetrahydro-5,6-benzindiazene, 2-methyl-3-diphenylmethyl-1,4-naphthoquinone, 2,3-diphenyl-1-naphthol, naphtho[2',3':3,4]-pyrazole-1',4'-quinone, 3,4-dichloro-1,2-benzophenazine, 2-iodo-1,4-naphthoquinone, 1,4,5,8-tetrahydroxy-2,3:6,7-dibenzothianthrene, 5,8-dihydroxy-2,3:6,7-dibenzo-thianthrene-1,4-quinone, 2,3-diphenoxy-1,4-naphthoquinone, dinaphtho[2',3':2,3][1",2":5,4]furan-1',4'-quinone, 2,3,5,8-tetrachloro-1,4-naphthoquinone, N,N'-bis-(1,4-naphthoquinone-2-yl)benzidine, 2-anilino-1,4-naphthoquinone-4-anil, 4-anilino-1,2-naphthoquinone-2-anil, phenylrosindarine, 2-anilino-1,4-naphthoquinone-(p-dimethylaminoanil), 2-anilino-1,4-naphthoquinonedianil, 2-anilino-3-phenyl-1,4-naphthoquinone, 2-anilino-3-bromo-1,4-naphthoquinone, 2-anilino-4-chloro-1,4-naphthoquinone, 2,3-dianilino-1,4-naphthoquinone, 2,3-dianilino-1,4-naphthoquinonedianil, nitrosoaminonaphtho-quinone, 3-chloro-2-phenylnitrosoamino-1,4-naphthoquinone, phenyl-bis-(3-anilino-1,4-naphthoquinone-2-yl)-amine, 3-chloro-2-(p-tolylnitrosoamino)-1,4-naphthoquinone, 2,7-dihydroxy-1-nitrosonaphthalene, 4-benzeneazo-1,3-dihydroxynaphthalene, di-(3-hydroxy-1,4-naphthoquinonyl-2-)methane, anhydroalkannin, diquinoxalino-[2',3':1,2:2",3":3,4]naphthalene and 3,4-phthaloylfurazane; and anthraquinones and derivatives thereof, such as 1,2-anthraquinone, 2,3-anthraquinone, 1,4-anthraquinone, 9,10-anthraquinone, 1,5-anthraquinone, 2,6-anthraquinone, 1,10-anthraquinone, 9,9-bis(p-hydroxyphenyl)anthrone, anthraquinone bisdiphenylmethide, bisphenylhydrazone, benzanthrone, anthrahydroquinone, β-ethylanthraquinone, 1,3,5,7-tetramethylanthraquinone, 2,2'-dianthraquinonylethane, 2,2'-dianthraquinonylethylene, 1,2,3-trihydroxyanthraquinone, anthrachrysone, erythrooxyanthraquinone, alizarin, quinizarin, anthrarufin, chrysazin, hystazarin, anthraflavin, isoanthraflavin, anthragallol, purprin, oxyanthrarufin, anthrapurprin, oxychrysazin, oxyflavopurprin, Rufiopin, quinalizarin, alizarinpentacyanine, rufigallol, Anthracene Blue WR, alizarinhexacyanine, 2-chloroquinizarin, 1-nitroanthraquinone, purpurin, 2,4,6,8-tetrabromoanthrachrysone, 3-aminoanthrapurpurin, 1,8-dinitroanthraquinone, α-aminoanthraquinone, 1,1'-dianthraquinonyl, dianthraquinoneimide, 1,4-dimethylaminoanthraquinone, 5-amino-1-nitro-6,8-dibromoanthraquinone, 1,5-tetramethyldiamino-4,8-dinitroanthraquinone, anthra-quinoneacridone, bis-N-(2-hydroxyanthraquinolyl)-p-phenylenediamine, leucoquinizarin, Quinizarin green, 1-amino-2,4-dibromoanthraquinone, 1,4-diacylaminoanthraquinone, anthra-quinone-β-aldehyde, o-diazine, 6,7-phthaloyl-1,9-benzanthrone, oxynitrosoanthraquinone, 1,1'-dianthraquinolyl, azoxyanthraquinone, 8-chloropyrazolanthrone, 2,6-dihydrazinoanthraquinone, anthraquinone diazonium salt, β-anthraquinone-hydrazine, azoxyanthraquinone, pyrazoleanthrone, 1-(anthraquin-2-yl)-3-methylpyrazolone, 1-hydroxylamino-anthraquinone, 1,5-dihydroxylaminoanthraquinone, 1-nitrosoanthraquinone, 1-hydrazinoanthraquinone, 1,5-dihydrazinoanthraquinone, 1-azidoanthraquinone, 2-azidoanthraquinone, anthraquinonemethylsulfoxide, 1,4-dirhodaneanthraquinone, β,β'-dianthraquinolyl sulfide, anthraquinonesulphenyl chloride, 2,2'-dianthraquinonyl, 1,1'-dianthraquinonyl, helianthrone, mesobenzodianthrone, 2,2'-diamino-1,1'-dianthraquinolyl, flavanthrone, 2,2'-dicyantolyl, mesonaphthodianthrone, 1,1'-dianthraquinolylamine, quinizarinquinone, hystazarinquinone, alizarinquinone and 6-hydroxyquinizarinquinone.

With respect to the non-benzene type aromatic compounds, the following are examples thereof:

azulene, cyclodecapentane, cyclodecaheptan, cyclooctadecanonaene, cyclotetracosadodecaene, heptalen, fulvalene, sesqui-fulvalene, heptafulvalen, perinaphthene, indeno[2,1-a]peri-naphthene, dibenzo[bf]oxepine, dibenzo-[bf]thiepine, indolizine, cyclo[3,2,2]azine, 4,5-benzotropolone, 3,4-benzotropolone, 5H-benzocycloheptene, 7H-benzocycloheptene, colchicine, colchicein, colchinol methyl ether, ditropyl ether, ditropyl sulfide, cyclopentadienyltropylidene, benzoazulene, carbinol, 4,5-benzotropone, 2-phenyltropone, naphthocycloheptadienone, naphthotropone, tribenzotropone, 1-amino-1,3-dicyanoazulene, benzoylhydrazone, 3-phenyl-1-hydroxyaazuranone-2,2-benzyltropone, 3-methyl-2-phenyltropone, 2,7-diphenyltropone, 2-(α-naphthyl)tropone, 2,7-tetramethylene-4,5-benzotropone, 2,7-diphenyl-4,5-benzotropone, naptho[2',3'-4,5]tropone, naphtho[2',1'-2,3]tropone, dibenzosuberane, naphtho[1',2'-2,3]tropone, dibenzosuberol, 4-hydroxy-2-phenyltropone, 4,5,7-tribromo-2-phenyltropone, 3,5'-ditropone, 3-(p-methoxyphenyl)tropone, 4-hydroxy-2-phenyltropone, 3-(α-naphthyl)tropone, 3,4-diphenyltropone, 3,7-dibenzyltropone, 4-(γ-phenylpropyl)tropone, 3,5'-bitroponyl, 4-(p-nitrostyryl)tropone methyl ether, 2-amino-1,3-dicyanoazurene, benzo[b]tropothiazine, 5-bromo-2-phenyltropone, 4-bromo-2,7-diphenyltropone, diphenylbiphenyl-carbinol and thiazinotropone.

In the next place, specific examples of the heterocyclic compounds having at least 5 conjugated π bonds are enumerated below.

With respect to the oxygen-containing heterocyclic compounds, the following are examples thereof:

furan and derivatives thereof, such as 2,5-diphenylfuran, 2-phenylfuran, 3-methyldiphenylfuran, lepidene, pyridoxine and 2,4-diphenylfuran;

benzofuran, isobenzofuran, dibenzofuran and derivatives thereof, such as dibenzofuran, furano[2',3'7,8]flavone, egonol, Euparin, 1,3-diphenylisobenzofuran, tetraphenyl glycol, tetraphenylphthalan, 9-phenylanthracene, o-hydroxymethyltriphenylcarbinol, 3,3'-diphenylphthalide, 1-phenylphthalan, 1,1-phenylphthalan, 3,3-diphenylphthalide, rubrene, α-sorinine, 2,2'-dihydroxybiphenyl, 2,2'-diaminobiphenyl, phenazone, dibenzoquinone, 2-hydroxybenzofuran, 2-methylbenzofuran, benzo[a]benzofuran, benzo[b]benzofuran, dibenzo[a,f]dibenzofuran, dibenzo-[c,d]dibenzofuran, dibenzo[c,e]dibenzofuran, bis(2-dibenzofuryl) and bis(3-dibenzofuryl);

pyran and pyrone derivatives, such as 2-p-hydroxyphenyl-4,6-diphenylpyrylium ferrichloride, anhydrobase, benzopyran, 4-p-hydroxyphenyl-2,6-diphenylpyrylium ferrichloride and 6-phenylcoumarin;

chromenol and chromene derivatives, such as 6-methyl-2,3-diphenylchromone, 6-methyl-2,3-diphenyl-4-(p-tolyl)-1,4-benzopyran-4-ol, chromanol, γ-chromene, oxycoumarone, chromene, cyanizine chloride, fisetin, 6-hydroxy-3-methoxy-5,7-dimethylflavirium chloride, 4,4'-diflavilene-3,3'-oxide, chrysinidine, apigenidine, rotoflavinidine, lutesonidine, galanginidine, fisenidine, molinidine, flavoneimine, pelargonidin, cyanidin, delphinidin, petunidin, syringggidin, histidin, apigenidin, carajurin, dracorhodin and dracorubin;

flavone, flavonol and isoflavon derivatives, such as flavonol, flavone and fukugetin;

coumarin and isocoumarin derivatives, such as 7-hydroxy-3,4-benzocoumarin, dicoumarol, angelicin, psoralen, bergapten, bergaptol, xanthoxin, xanthoxal, isopimpinellin, pimpinellin, oroselol, oroselone, peucedanin, oxypeusedanin, ostruthol, medakenine, nodakenetin, seselin, xanthyletin, xanthoxyletin; and xanthone and related compounds, such as dixanthylene, 9-phenylxanthene, isoxanthone, 1,2,7,8-dibenzoxanthene, 3,9-diphenylxanthene and 9.9-diphenylxanthene.

With respect to the nitrogen-containing heterocyclic compounds, the following are examples thereof:

pyrroles, such as 1-phenylpyrrole, 5-phenylpyrrole-2-aldehide, phenyl-2-pyrrylketoneoxime, 2-phenylpyrrole, 2-methyl-1-phenylpyrrole, 2-methyl-4-phenylpyrrole, 2-methyl-5-phenylpyrrole, 3-methyl-5-phenylpyrrole, 2,4-diphenylpyrrole, 2,5-diphenylpyrrole, 2,3-diphenylpyrrole, 2,3,5-triphenylpyrrole, 1,2,3,5-tetraphenylpyrrole, diphenyl-2-pyrrolylcarbinol, pyrrolecyclotrimethyne dye, pyrrolepolymethylene dye, biliverdin, bilirubin, prodigiosin and stercobilin;

indoles, such as 5,7-dichloro-2-phenylindole, 7-chloro-2-phenylindole, 5,7-dibromo-2-phenylindole, 7-bromo-5-chloro-2-phenylindole, 2-(3'-indolyl)-3-isonitrosoindolenine, Roseindole, triptphan Blue, indolo[3,2-c]quinoline, indolo-[1,2-c]quinazoline, 2-phenylindole, 3-nitro-2-phenylindole, 3-phenylindole, N-methyl-3-phenylindole, 3-(o-nitrophenyl)-indole, 2,3-diphenylindole, 3-triphenylmethylindole, 2-methyl-3-triphenylmethylindole, 2-phenyl-3-triphenylmethylindole, 2-(1-naphthyl)triphenylmethylindole, 2-(2-naphthyl)-3-triphenylmethylindole, 3,3', -diindolyl, 3,2'-diindolyl, 3,3'-dehydrodiindole, Roseindole, 3-nitroso-2-phenylindole, 3-nitro-2-phenylindole, 2-methyl-3-phenylazoindole, 2-phenyl-3-phenylazoindole, 6-hydroxy-3-phenylindole, triptophan, 4,5-benzotriptophan, 6,7-benzotriptophan and violasein;

oxo derivatives of indole, such as 3-(4-ethoxy-1-naphthyl)oxyindole, indophenine, indigoazine and Indigo Yellow 3G;

isoindoles, such as 1-chloro-4-methylphthalazine, 1-benzilidenephthalimidine, 2-methyl-3-phenylphthalimidine, 2-methyl-1,3-diphenylisoindole, 2,5-diphenylisoindole, β-isoindigo and dimethylimino-β-Isoindigo;

carbazoles, such as 1-phenyl-1,2,3-benzotriazole, 2,2'-diaminodiphenyl and 1,1'-dicarbazole;

porphyrins, such as porphyrazine, magnesium octamethyltetraazaporphyrin, azadipyromethine, phthalocyanine, diazacoproporphyrin, porphine, mesotetraphenylporphyrin, chlorophyll-b and chlorophyll-a;

oxazoles, such as 2-phenyloxazole, 4-phenyloxazole, 5-phenyloxazole, 2-methyl-4-phenyloxazole, 2-methyl-5-phenyloxazole, 4-methyl-2-phenyloxazole, 5-methyl-2-phenyloxazole, 4,5-dimethyl-2-phenyloxazole, 2,4-diphenyloxazole, 2,5-diphenyloxazole, 4,5-diphenyloxazole, 2-methyl-4,5-diphenyloxazole, 2,4,5-triphenyloxazole, 2-(o-nitrophenyl)oxazole, 2-(p-nitrophenyl)oxazole, 2-amino-5-phenyloxazole, 2-(p-amino-phenyl)oxazole, 2-(o-aminophenyl)oxazole, 4,5-dimethyl-2-phenyloxidooxazole, 4-methyl-2,5-diphenyloxidooxazole, 2,4,5-triphenyloxidooxazole, 4-(o-methoxycarbonylbenzal)-2-phenyl-5-oxazolone, oxacarbocyanine dye and phenanthrooxazole;

isooxazoles, such as 4-nitro-3-phenylisooxazole, 5-amino-3-methyl-4-phenylisooxazole and 5-benzoyl-3,4-diphenylisooxazole;

thiazoles, such as 4-phenylthiazole, 5-phenylthiazole, 5-(p-fluorophenyl)thiazole, 2-methyl-4-phenylthiazole, 4-methyl- 5-phenylthiazole, 5-methyl-4-phenylthiazole, 4,5-diphenylthiazole, 2-methyl-4,5-diphenylthiazole, 1,4-bis(4-methyl-2-thiazolyl)benzene, p,p'-bis(4-methyl-2-thiazolyl)-biphenyl, 2-amino-4-phenylthiazole, 2-amino-5-phenylthiazole, 2-amino-4,5-diphenylthiazole, 2-phenylazothiazole, 2-amino-4-methyl-5-phenylazothiazole, 4-methyl-2-phenylazothiazole, α-naphthothiazole, β-naphthothiazole, naphtho[2,3]thiazole, naphtho[1,2]thiazole, 2-methyl[1,2]thiazole, 2-phenylnaphtho-[1,2]thiazole, 2-methylnaphtho[2,1]thiazole, 4-bromo-2-phenylnaphtho[2,3]thiazole, 2-hydroxynaphtho[2,1]thiazole, 2-aminonaphtho[1,2]thiazole, 2-aminonaphtho[2,1]thiazole, 2-mercaptonaphtho[1,2]thiazole and 2-mercaptonaphtho[2,1]thiazole;

imidazoles, such as 2-phenylimidazole, 4-phenylimidazole, 4-methyl-2-phenylimidazole, 2,4-diphenylimidazole, 4,5-diphenylimidazole, 2,4,5-triphenylimidazole, 2-bromo-4-phenylimidazole, 5-chloro-1-ethyl-2-phenylimidazole, 5-chloro-1,2-diphenylimidazole, 2-phenylazoimidazole, 2-methyl-4-phenylazoimidazole and 2-(o-aminophenyl)benzoimidazole;

pyrazoles, such as 3-phenylpyrazole, 5-phenylpyrazole, 4-phenylpyrazole, 1-methyl-3-phenylpyrazole, 1-methyl-5-phenypyrazole, 3-methyl-5-phenylpyrazole, 1,3-diphenylpyrazole, 1,5-diphenylpyrazole, 1,3,4-triphenylpyrazole, 1,3,5-triphenylpyrazole, 1,4,5-triphenylpyrazole, 5-amino-3-phenylpyrazole, 3-amino-5-phenylpyrazole, 5-methyl-1,3-diphenylpyrazole-4-aldehyde, 3,5-diacetyl-4-phenylpyrazole and 4benzoyl- 1,5-diphenylpyrazole;

oxadiazoles, such as 3-phenylfurazane, 3,4-diphenylfurazane, naptho[1,2]furazane, phenylfuroxane, 3-methyl-5-phenyl-1,2,4-oxadiazole and 2,5'-diphenyl-1,3,4-oxadiazole;

thiadiazoles, such as 5-phenyl-1,2,3-thiadiazole, 2-phenyl-1,3,4-thiadiazole, 5,5'-diphenyl-2,2'-bis(1,3,4-thiadiazole), 2-hydroxy-5-phenyl-1,3,4-thiadiazole and 2-methylsulfonyl-5-phenyl-1,3,4-thiadiazole;

triazoles, such as 2-phenyl-1,2,3-triazole and 5-(p-aminophenyl)-3-mercapto-1,2,4-triazole;

tetrazoles, such as 5-phenyltetrazole, 1,5-diphenyltetrazole, 1-hydroxy-5-phenyltetrazole and 1-amino-5-phenyltetrazole;

pyridine related compounds, such as 2-phenylpyridine, 2,2'-dipyridyl, 2-chloro-6-phenylpyridine, 2,6-dichloro-3-phenylpyridine, 2,2'-azopyridine, 3,3'-azopyridine, benzene-4-azopyridine, 5-chloro-2,2'-azopyridine, 5,5'-dichloro-2,2'-azopyridine, 4-pyridylazoresorcin, 4-pyridyl-m-phenylenediamine and 3-pyridyl-m-phenylenediamine;

quinoline and related compounds, such as quinoline, quinaldine, quinaldine-N-oxide, ethylquinoline, 2-phenylquinoline, 3-methylquinoline, 3-phenylquinoline, 4-methylquinoline, 4-phenylquinoline, 6-methylquinoline, 6-ethylquinoline, 6-phenylquinoline, 2,4-dimethylquinoline, 2,4-diphenylquinoline, quinoline-4-methanol, quinoline[6,5-f]-quinoline, quinophthalone, flavaaniline, Quinoline Blue, Ethyl Red, pinacyanol, naphthocyanol, cryptocyanine, xenocyanine, azacyanine, 6,6'-octahydroquinoline, Besthorn's red, 2,3'-biquinoline, 2,5'-biquinoline, 2,6'-biquinoline, 2,7'-biquinoline, 3,3'-biquinoline, 4,5'-biquinoline, 4,6'-biquinoline, 5,5'-biquinoline, 6,6'-biquinoline, 6,7'-biquinoline, 6,8'-biquinoline, 7,7'-biquinoline, 8,8'-biquinoline, 2-fluoroquinoline, 3-fluoroquinoline, 4-fluoroquinoline, 5-fluoroquinoline, 6-fluoroquinoline, 7-fluoroquinoline, 8-fluoroquinoline, 3-bromoquinoline, 4-chloroquinoline, 2,4-dichloroquinoline, 3-nitroquinoline, 4-nitroquinoline, 2,3-quinolinediol, quinoline-2-thiol, 2-hydroxyquinoline-3-thiol, 2-aminoquinoline, 8-aminoquinoline, 2-hydraziquinoline, pyroloquinoline, thiazoloquinoline, pyrimido[4,5-b] quinoline and benzo[f]quinoline;

isoquinoline and related compounds, such as 1-methylisoquinoline, 3-bromomethylisoquinoline, 1-phenylisoquinoline, 4-phenylisoquinoline, 1,1'-biisoquinoline, 5,5'-biisoquinoline, 1-chloroisoquinoline, 5-iodoisoquinoline, 5-bromoisoquinoline, 5-nitroisoquinoline, isoquinoline-1,3-diol, 6,7-methylenedioxyisoquinoline, 1-aminoisoquinoline, 1-cyanoisoquinoline, 1-phenylbenzo[g]3,4-dihydroisoquinoline and 3-(p-aminophenyl)-5,6-dihydro-8,9-dimethyloxyimidazo[5,1-a]-isoquinoline;

acridine and related compounds, such as acridine, 1-methylacridine, 9-phenylacridine, 9-(3-bipyridinyl) acridine, 2-chloroacridine, 2-bromoacridine, 2-acridinol, acridin-3,6-diol, 4-methoxyacridine, 9-phenoxyacridine, 1-nitroacridine, 4-aminoacridine, 1-aminoacridine, 9-phenylaminoacridine, 9-hydroxyacridine, chrysaniline, acriflavine, 3,6-diamino-4,5-dimethylacridine and acrynol;

phenanthridines, such as 3,4-benzoquinoline, 6-methylphenanthridine, 6-aminomethylphenanthridine, 6-phenylphenanthridine, 6-chlorophenanthridine, 6-bromophenanthridine, 6-nitrophenanthridine, 1-aminophenanthridine and 3-hydroxyphenanthridine;

anthrazolines, such as pyrido[2,3-g]quinoline, 2,7-diphenyl[2,3-g]quinoline and 2,8-diphenylpyrido[3,2-g]quinoline;

pyridoindoles, such as 1,9-pyridoindole, 2,9-pyridoindole and 2,9-pyridoindole;

naphthyridine and related compounds, such as 1,5-naphthyridine, 1,7-naphthyridine, 1,8-naphthyridine, 1,6-naphthyridine, 2,6-naphthyridine, 2,7-naphthyridine, 1,5-naphthyridine-4-ol, 3-amino-1,5-naphthyridine, 2-amino-1,5-naphthyridine and 2-hydroxy-1,7-naphthyridine;

oxazine and related compounds, such as phenoxyazinon, resazurin, carocyanin, Nile Blue A, Merdora's Blue and Brilliant Cresyl Blue;

thiazine and related compounds, such as o-benzaminophenyl-β-phenoxycarbonylethyl sulfide, phenothiazine, nitrophenothiazine, 3-chloro-10-ethylphenothiazine, 4-amino-4'-anilinodiphenyl disulfide, 2-chloro-10-(3-dimethylaminopropyl) phenothiazine, chloropromazine, 10-(2-dimethylamino-1-propyl)phenothiazine hydrochloride, 10-[2-(1-pyrrolidyl)-ethyl]phenothiazine hydrochloride, 10-(1-methyl-3-piperidylmethyl) phenothiazine, 2-acetyl-10-(3-dimethylaminopropyl)-phenothiazine and Methylene Blue;

pyridazine and related compounds, such as cinnoline, 3-methylcinnoline, 4-chlorocinoline, 3-bromocinnoline, 4-cinnolinol, 4-aminocinnoline, phthalazine, 4-ethyl-2-phenylphthalazine, phthalazine thiol, 1(2H)-phthalazinone, 3-phenylpseudophthalazine, 4-methyl-3-phenylpseudophthalazine and 2,3-dihydro-1,4-phthalazinedione;

pyrimidine and related compounds, such as 2-cinnamethylpyrimidine, 4,6-dimethyl-2-phenylpyrimidine, 2,4,6-triphenylpyrimidine, aloxantin, 2,6-dihydroxy-4-phenylpyrimidine, 4,6-dihydroxy-2-phenylpyrimidine, 5-chloro-4,6-dihydroxy-2-phenyl-pyrimidine, sulfadiazine, sulfisomidine, thonzylamine hydrochloride, Vitamin B1, thiochrome, co-carboxylase, allomycin, 6-(furfuryl)aminopurine, pteridine, 2,4-pterine diol, 2-amino-6-methyl-4-pteridiol, xanthopterine, leucopterine, isoxanthopterine, quinazoline, 4-chloroquinazoline, 2,4-dichloroquinazoline, 4-quinazoline and 2,3-diphenyl-4-quinazoline;

pyrazine related compounds, such as 3,6-diphenylpyrazinol, quinoxaline, 2-methylquinoxaline, 2-chloroquinoxaline, 2,3-dichloroquinoxaline, 2-(o-aminoaniline)quinoxaline, N,N'-diphenyl-2,3-piperazione, 2-quinoxalinol, 2,3-quinoxaline diol, 2-aminoquinoxaline, 2,3-diaminoquinoxaline, methylquinoxaline-2-carboxylic acid ester, 2-(d-arabotetraoxybutyl)quinoxaline, flavazole, glucazidone, phenazine, phenazine-5-oxide, phenazine-5,10-dioxide, 5-methylphenazinium methylsulfate, 10-methyl-5,10-dihydro-2-phenazinecarbonitrile, 2-phenazinecarbonitrile, 1-phenazinol, 1-methoxyphenazine, 2-phenazinol, 1,6-dioxyphenazine-5,10-dioxide, 1-aminophenazine, 2-aminophenazine, 2,3-diaminophenazine, Neutral Red, 5,10-dihydrophenazine, 5-methyl-5,10-dihydrophenazine and 1,2,3,4-tetrahydrophenazine; and tri- and tetra-hetero six-membered cyclic compounds, such as 2,4,6-triphenyl-s-triazine, 2,4-dichloro-6-o-chloroaniline-s-triazine, 5,6-diphenyl-as-triazine, 2,6-diphenyl-2,3,4,5-tetrahydro-as-triazine, 5,6-diphenyl-as-triazine-3-ol, 1,2,4-benzotriazine, 1,2,4-benzotriazine-3-ol, 3-phenyl-1,2,3-benzotriazine-4-(3H)-one, 1,2,3-benzotriazine-4-ol, 1,2,3-benzotriazine-4-thiol, 3-amino-1,2,3-benzotriazine, 2,3-diphenylosotetrazine, 5,6-dimethyl-2,3-diphenylosotetrazine, 5-cyano-2,3-diphenylosotetrazine, 5,6-dibenzoyl-2,3-diphenylosotetrazine, 2,3-dibenzoyl-5-methylosotetrazine, 2,3-dibenzoyl-5,6-dimethylosotetrazine, 2,3-dibenzoyl-5,6-diphenylosotetrazine, 2,3-bis(2,4-dichlorophenyl)-5,6-diphenyl-1,2,3,4-tetrahydro-v-Tetrazine, 1,2,3,4-tetraethoxy-carbonyl-5,5-diphenyl-1,2,3,4,5,6-hexahydro-v-tetrazine, 7-methyl-2-(4-methylphenyl)-1,2-dihydrobenzotetrazine, 3,6-diphenyl-1,2-dihydro-s-tetrazine and 3,3,6,6-tetraphenyl-1,2,3,6-tetrahydro-s-tetrazine.

With respect to the sulfur-containing heterocyclic compounds, the following are examples thereof:

sulfur-containing heterocyclic compounds, such as 2-phenylthiophene, 2,4-diphenylthiophene, 2,3,4,5-tetraphenylthiophene, metaphenylene hydrochloride, metapyrylene hydrochloride, chlorothene citrate, thenyldiamine hydrochloride α-quinquithienyl and α-sexithienyl;

fused thiophene type compounds, such as 3,3'-diiminothioindigo, indigoron, dihydronaphtho[2,1-b]thianaphthene, 1,3-diphenylisothianaphthene, dibenzothiophene, 2-nitrodibenzothiophene, aminodibenzothiophene, 2,8-diaminodibenzothiophene, dibenzothiophene-5-dioxide, 4-hydroxydibenzothiophene, 2,8-dihydroxydibenzothiophene, 2-chlorodibenzothiophene, 1-bromodibenzothiophene, 2,8-dibromodibenzothiophene, 2-iododibenzothiophene, 2-acetyldibenzothiophene, 2,8-diacetyldibenzothiophene, naphthothiophene, 3-oxythiophanthrene, 2,3-thiophanthraquinone, naphtho[2,3-c]thiophene, naphtho[1,2-b]thiophene, naphtho[2,1-b]thiophene, naphtho[1,2-c]thiophene, 1,2-naphtho[2,1-b]thiophenequinone, 1-hydroxy-2-naphtho[2,1-b]thiophenealdehyde, naphtho[1,2-c]thiophene, 2H-naphtho[1,8]thiophene, benzo[b]thiophanthrene, 6,11-benzo[b]-thiophanthraquinone, benzo[g]thiophanthrene, 4,5-benzothiophanthrene and 8,9-benzothiophanthrene;

five-membered monocyclic compounds containing 2 hetero atoms, such as 5-phenyl-1,2-dithiol-3-thione, 3,4-dihydro-naphtho-2,1-trithione, thiaflavone, thiacoumarin, thiaxanthene, thiaxanthohydrol, thiaxanthone, Milacil D and bisthiaxanthylene;

six-membered cyclic compounds having two or more hetero atoms, such as 2,5-diphenyl-1,4-dithiadiene, thiophenealdehyde, thianthrene, 2,7-dimethylthianthrene, 1-thianthrenyl lithium, 1-chlorothianthrene, phenoxthine, 2-vinylphenoxthine, 2-aminophenoxthine, 2-nitrophenoxthine, 3,7-dinitrophenoxthine, 10,10-diphenylphenoxthine and 2,5-diphenylthiophene.

With respect to other useful compounds, the following are examples thereof:

dicyclic compounds wherein two rings share a nitrogen atom, such as cinchonine, 2-phenylpyrrocoline, 3-ethyl-2-phenylpyrrocoline, 3-benzyl-2-phenylpyrrocoline, 3-nitroso-2-phenylpyrrocoline, 2:3-benzopyrrocoline, 1,5,8-trimethyl-2:3-benzopyrrocoline, 1-ethyl-5,8-dimethyl-2:3-benzopyrrocoline, 1,8-dimethyl-2:3-benzopyrrocoline, 3-phenyl-7:8-benzopyrrocoline, cyclo[3.3.3]azine, cyclo[3.2.2]azine, 2-phenylcyclo-[3.2.2]azine, 2,3-diphenylcyclo[3.2.2]azine, tricycladine, 7-methylbenzo[a]quinolidinium bromide, benzo[b]quinolidinium salt, tetrahydro-Ψ-berberine, tetrahydroberberine, laudanosoline, tetrahydro-2,3,9,10-tetraoxy-7-methyldibenzopyrrocolium chloride, homolaudanosoline, octadehydromatrine, canadine-mathoiodide and tetrahydropalmatinemethoiodide; and alkaloids, such as nicotyline, 3',2-dipyridyl, cusparine, galipoline, 1-methyl-2-quinolone, casimiroin, 2-pentylquinoline, 4-hydroxy-2-pentylquinoline, 4-methoxy-2-pentylquinoline, 1-methyl-2-pentyl-4-quinolone, 4-methoxy-2-phenylquinoline, 7-methoxy-1-methyl-2-phenyl-4-quinolone, cuspareine, dictamnine, skimmianine, evolitrine, maclurin, kokusagine, kokusaginine, maculosidine, flindersiamine, evoxoidine, evoxine, evolatine, acronycidine, medicosmine, acronidine, γ-fagarine, cinconin, quininone, quinotoxin, N-bromoquinotoxin, dihydrocinchonicine, heteroquinine, evoxantidine, xanthoquinoline, 1,3-dimethoxy-10-methylacridone, evoxanthine, xanthevodine, melicopine, melicopidine, melicopicine, acronycine, flindersine, papaverin, papaveraldine, laudanosine, laudanine, codamine, protopapaverine, almepavine, 4,4',5-trimethoxy-2-vinylstilbene, coclaurine, d-isococlaurine, neprotin, corpaverine, phellodendrine, magnocurarine, coclanoline, narcotin, narcotoline, aponarceine, cinchonin, cinchotoxine, dihydrohydrastine, bicuculline, adlumidine, corlumidine, cordrastine, magnolamine, berbamine and o-methylberbamine.

In the method of the present invention, the conjugated π-bond compounds as recited above can be used in combination with dyes and/or pigments.

As examples of such dyes and pigments, mention may be made of:

azo dyes and pigments, such as monoazo and polyazo dyes and pigments, metal complex azo dyes and pigments, stilbene azo dyes and thiazole azo dyes;

anthraquinone dyes and pigments, such as anthraquinone derivatives and anthrone derivatives;

indigoid dyes and pigments such as indigo derivatives and thioindigo derivatives;

phthalocyanine dyes and pigments;

carbonium dyes and pigments, such as diphenylmethane dyes, triphenylmethane dyes and pigments, xanthene dyes and acridine dyes;

quinoneimine dyes, such as azine dyes, oxazine dyes and thiazine dyes;

methine dyes, such as polymethine dyes and cyanine dyes;

quinoline dyes; nitro dyes; benzoquinone and naphthoquinone dyes; naphthalimide dyes and pigments; perinone dyes; sulfide dyes; fluorescent dyes; azoic dyes; and reactive dyes.

Those dyes and pigments can be used alone or as a mixture of two or more thereof.

Of the dyes and pigments as mentioned above, azine dyes are preferred over the others in the present invention.

Specific examples of dyes and pigments which can be used are enumerated below.

Azo dyes and pigments include the following compounds:

Exemplary monoazo and polyazo dyes are Basic Yellow 32, 34 and 36; Basic Orange 2, 32, 33 and 34; Basic red 17, 18, 22, 23, 24, 32, 34, 38, 39 and 40; Basic Violet 26 and 28; Basic Blue 58, 59, 64, 65, 66, 67 and 68; Basic Brown 1, 4, 11 and 12; Basic Black 8; Azoic Diazo component 4, 21, 27 and 38; Disperse Yellow 3, 4, 5, 7, 8, 23, 50, 60, 64, 66, 71, 72, 76, 78 and 79; Disperse Orange 1, 3, 5, 13, 20, 21, 30, 32, 41, 43, 45, 46, 49, 50 and 51; Disperse Red 1, 5, 7, 12, 13, 17, 43, 52, 54, 56, 58, 60, 72, 73, 74, 75, 76, 80, 82, 84, 88, 90, 97, 99, 101, 103, 113, 117, 122, 125, 126, 128 and 129; Disperse Violet 10, 24, 33, 38, 41, 43 and 96; Disperse Blue 85, 92, 94 and 106; Disperse brown 3 and 5; Disperse Black 1, 2, 10, 26, 27, 28, 29, 30 and 31; Solvent Yellow 2, 6, 14, 15, 16, 19, 21 and 56; Solvent Orange 1, 2, 5, 6, 14 and 45; Solvent red 1, 3, 23, 24, 25, 27 and 30; Solvent Brown 3, 5 and 20; Solvent Black 3; Pigment Yellow 1, 2, 3, 4, 5, 6, 7, 10, 11, 12, 13, 14, 15, 16, 17, 23, 65, 73 and 83; pigment Orange 1, 2, 5, 13, 14, 15, 16, 17, 24 and 31; Pigment Red 1, 2, 3, 4, 5, 6, 7, 8, 9, 10, 11, 12, 13, 14, 15, 16, 17, 18, 18, 21, 22, 23, 30, 31, 32, 37, 38, 39, 40, 41, 48, 49, 50, 51, 52, 53, 54, 55, 57, 58, 60, 63, 64, 68, 112, 114 and 163; pigment Blue 25; pigment green 10; Pigment Brown 1 and 2; pigment Black 1; direct Yellow 1, 8, 11, 12, 24, 26, 27, 28, 33, 44, 50, 58, 85, 86, 87, 88, 89, 98, 100 and 110; direct Orange 1, 6, 8, 10, 26, 29, 39, 41, 49, 51, 57, 102 and 107; Direct red 1, 2, 4, 13, 17, 20, 23, 24, 28, 31, 33, 37, 39, 44, 46, 62, 63, 75, 79, 80, 81, 83, 84, 89, 95, 99, 113, 197, 201, 218, 220, 224, 225, 226, 227, 228, 229, 230 and 231; Direct Violet 1, 7, 9, 12, 22, 35, 51, 63, 90, 94 and 98; Direct Blue 1, 2, 6, 8, 15, 22, 25, 71, 76, 77, 78, 80, 120, 123, 158, 160, 163, 165, 168, 192, 193, 194, 195, 196, 203, 207, 225, 236, 237, 246, 248 and 249; Direct Green 1, 6, 8, 28, 30, 31, 33, 37, 59, 63, 64 and 74; Direct brown 1A, 2, 6, 25, 27, 44, 58, 59, 101, 106, 173, 194, 195, 209, 210 and 211; Direct black 17, 19, 22, 32, 38, 51, 56, 71, 74, 75, 77, 94, 105, 106, 107, 108, 112, 113, 117, 118, 132, 133 and 146; Acid Yellow 11, 17, 19, 23, 25, 29, 36, 38, 40, 42, 44, 49, 61, 70, 72, 75, 76, 78, 79, 110, 127, 131, 135, 141, 142, 164 and 165; Acid Orange 1, 7, 8, 10, 19, 20, 24, 28, 33, 41, 43, 45, 51, 56, 63, 64, 65, 67 and 95; Acid red 1, 6, 8, 9, 13, 14, 18, 26, 27, 32, 35, 37, 42, 57, 75, 77, 85, 88, 89, 97, 106, 111, 114, 115, 117, 118, 119, 129, 130, 131, 133, 134, 138, 143, 145, 154, 155, 158, 168, 249, 252, 254, 257, 262, 265, 266, 274, 276, 282, 283 and 303; Acid violet 7, 11, 97 and 106; Acid Blue 29, 60, 92, 113, 117 and 120; Acid green 19, 20 and 48; Acid Brown 2, 4, 13, 14, 20, 53, 92, 100, 101, 236, 247, 266, 268, 276, 277, 282, 289, 301 and 302; acid Black 1, 7, 24, 26, 29, 31, 44, 76, 77, 94, 109 and 110; Mordant yellow 1, 3, 5, 23, 26, 30, 38 and 59; Mordant Orange 1, 4, 5, 6, 8, 29 and 37; mordant red 7, 9, 17, 19, 21, 26, 30, 63 and 89; Mordant Violet 5 and 44; Mordant Blue 7, 13, 44, 75 and 76; Mordant green 11, 15, 17 and 47; mordant brown 1, 14, 15, 19, 21, 33, 38, 40, 52 and 87; Mordant Black 1, 3, 7, 9, 11, 17, 26, 32, 38, 43, 44, 51, 54, 65, 75, 77, 84, 85, 86 and 87; Food Yellow 3 and 4; and Food Red 7 and 9;

exemplary metal complex azo dyes are Solvent Yellow 61 and 80; Solvent Orange 37, 40 and 44; Solvent red 8, 21, 83, 84, 100, 109 and 121; Solvent Brown 37; Solvent Black 23; Acid Black 51, 52, 58, 60, 62, 63, 64, 67, 72, 107, 108, 112, 115, 118, 119, 121, 122, 123, 131, 132, 139, 140, 155, 156, 157, 158, 159 and 191; Acid Yellow 59, 98, 99, 111, 112, 114, 116, 118, 119, 128, 161, 162 and 163; Acid orange 74, 80, 82, 85, 86, 87, 88, 112, 123 and 124; Acid Red 180, 183, 184, 186, 194, 198, 199, 209, 211, 215, 216, 217, 219, 256, 317, 318, 320, 321 and 322; Acid Violet 75 and 78; Acid Blue 151, 154, 158, 161, 166, 168, 170, 171, 175, 184, 187, 192, 199, 299, 234 and 236; Acid green 7, 12, 35, 43, 56, 57, 60, 61, 65, 73, 75, 76, 78 and 79; Acid Brown 19, 28, 30, 31, 39, 44, 45, 46, 48, 224, 225, 226, 231, 256, 257, 294, 296, 297, 299 and 300; Direct yellow 39; Direct Violet 47 and 48; Direct Blue 90, 98, 200, 201, 202 and 226; and Direct Brown 95, 100, 112 and 170;

an exemplary stilbene azo dye is Direct Black 62; and exemplary thiazole dyes are Direct Red 9 and 11.

Anthraquinone dyes and pigments include the following compounds:

Exemplary anthraquinone derivatives are Basic Violet 25; Basic Blue 21, 22, 44, 45, 47, 54 and 60; Azoic Diazo Component 36; Vat Yellow 2, 3, 10, 20, 22 and 33; Vat Orange 13 and 15; Vat Red 10, 13, 16, 31, 35 and 52; Vat Violet 13 and 21; Vat Blue 4, 6, 8, 12, 14, 64, 66, 67 and 72; Vat Green 8, 13, 43, 44 and 45; Vat Brown 1, 3, 22, 25, 39, 41, 44, 46, 57, 68, 72 and 73; Vat Black 8, 14, 20, 25, 27, 36, 56, 59 and 60; Disperse Orange 11; Disperse Red 4, 9, 11, 15, 53, 55, 65, 91, 92, 100, 104, 116 and 127; Disperse Violet 1, 4, 8, 23, 26, 28, 30 and 37; Disperse Blue 1, 3, 5, 6, 7, 20, 26, 27, 54, 55, 56, 60, 61, 62, 64, 72, 73, 75, 79, 81, 87, 90, 91, 97, 98, 99, 103, 104 and 105; Disperse yellow 51; Solvent Violet 13 and 14; Solvent Blue 11, 12, 35 and 36; Solvent Green 3; Pigment red 83 and 89; Pigment Blue 22; Acid Violet 31, 34, 35, 41, 43, 47, 48, 51, 54, 66 and 68; Acid Blue 23, 25, 27, 40, 41, 43, 45, 54, 62, 72, 78, 80, 82, 112, 126, 127, 129, 130, 131, 138, 140, 142, 143, 182, 183, 203, 204 and 205; Acid Green 25, 27, 28, 36, 40, 41 and 44; Acid Brown 27; Acid Black 48 and 50; Mordant red 3 and 11; Mordant Blue 8 and 48; mordant Black 13; and Pigment Violet 5;

exemplary anthrone derivatives are Vat Yellow 1 and 4; Vat Orange 1, 2, 3, 4 and 9; vat Violet 1, 9 and 10; Vat Blue 18, 19 and 20; vat Green 1, 2, 3 and 9; Vat black 9, 13, 29 and 57; Vat Red 13; and Acid Red 80, 82 and 83.

Indigoid dyes and pigments include the following compounds:

Exemplary indigo derivatives are Vat Blue 1, 3, 5, 35 and 41; Reduced Vat Blue 1; Pigment Violet 19 and 122; Acid Blue 74 and 102; Solubilized vat Blue 5 and 41; Solubilized Vat Black 1; and Food Blue 1;

exemplary thioindigo derivatives are Vat Orange 5; Vat Red 1, 2 and 61; Vat Violet 2 and 3; Pigment Red 87 and 88; and Vat Brown 3.

Phthalocyanine dyes and pigments may include, for example, Solvent Blue 55; Pigment Blue 15, 16 and 17; Pigment Green 36, 37 and 38; Direct Blue 86 and 199; and Mordant Blue 58.

Carbonium dyes and pigments include the following compounds:

An exemplary diphenylmethane dye is Basic Yellow 2;

exemplary triphenylmethane dyes are Basic Red 9; Basic Violet 1, 3 and 14; Basic Blue 1, 5, 7, 19, 26, 28, 29, 40 and 41; Basic Green 1 and 4; Solvent Violet 8; Solvent Blue 2 and 73; Pigment Violet 3; Pigment Blue 1, 2 and 3; Pigment Green 1, 2 and 7; Direct Blue 41; Acid Violet 15 and 49; Acid Blue 1, 7, 9, 15, 22, 83, 90, 93, 100, 103 and 104; Acid Green 3, 9 and 16; Mordant Violet 1; Mordant Blue 1, 29 and 47; Food Violet 2; Food Blue 2; and Food Green 2;

exemplary xanthene dyes are Basic Red 1; Solvent Red 49; Pigment Red 81 and 90; Pigment Violet 1,2 and 23; Acid Red 51, 52, 87, 92 and 94; Mordant Violet 1; Mordant Blue 1, 29 and 47; and Food Red 14; and exemplary acridine dyes are Basic Orange 14 and 15.

Quinoneimine dyes include the following compounds:

Exemplary azine dyes are Basic Red 2; Basic Black 2; Solvent Black 5 and 7; Acid Blue 59; Acid Black 2;

exemplary oxazine dyes are Basic Blue 3; Direct Blue 106 and 108; and exemplary thiazine dyes are Basic Yellow 1; Basic Blue 9, 24 and 25.

Methine dyes include the following compounds:

Exemplary polymethine (or cyanine) dyes are Basic Yellow 11, 13, 14, 19, 21, 25, 28, 33 and 35; basic Orange 21 and 22; Basic Red 12, 13, 14, 15, 27, 29, 35, 36 and 37; and Basic Violet 7, 15, 21 and 27.

Quinoline dyes may be exemplified by Basic Green 6; Disperse Yellow 54 and 56; Solvent Yellow 33; and Acid Yellow 3.

Nitro dyes may be exemplified by Disperse Yellow 1, 33, 39, 42, 49 and 54; and Acid Yellow 1.

Benzoquinone and naphthoquinone dyes may be exemplified by Disperse Blue 58 and 108; and Acid Brown 103, 104, 106, 160, 161, 165 and 188.

Naphthalimide dyes and pigments may be exemplified by Pigment Red 123; Vat Violet 23 and 39; and Acid Yellow 7.

Perinone dyes may be exemplified by Vat Orange 7 and 15.

Sulfide dyes may include, for example, Solubilized Sulfur Yellow 2; Sulfur Yellow 4; Sulfur Orange 3; Sulfur Red 2, 3, 5 and 7; Solubilized Sulfur Blue 15; Sulfur Blue 2, 3, 4, 6, 7, 9 and 13; Sulfur Green 2, 3, 6, 14 and 27; Solubilized Sulfur Brown 1 and 51; Sulfur Brown 7, 12, 15 and 31; Sulfur Black 1, 2, 5, 6, 10, 11 and 15; vat Yellow 35, 42 and 43; and Vat Blue 43 and 56.

Fluorescent dyes may include, for example, fluorescent brightening agents 14, 22, 24, 30, 32, 37, 45, 52, 54, 55, 56, 84, 85, 86, 87, 90, 91, 104, 112, 121, 134, 135, 153, 162, 163, 164, 166, 167, 168, 169, 170, 171, 172, 173, 174, 175, 176 and 177.

Azoic dyes may include, for example, Azoic Diazo Component 17, 20, 22, 24, 26, 31, 35, 41, 47, 48, 109 and 121; Azoic Coupling Component 2, 3, 4, 5, 7, 8, 10, 11, 12, 14, 15, 16, 17, 18, 19, 20, 23, 26, 28, 29, 35, 36, 37, 41 and 108; Azoic brown 2, 7, 11 and 15; Azoic Black 1 and 5; Azoic Yellow 1 and 2; Azoic Orange 2, 3 and 7; azoic red 1, 2, 6, 9, 16 and 24; Azoic Violet 1, 2, 6, 7, 9 and 10; and azoic Green 1.

Reactive dyes may include, for example, Reactive Yellow 1. 2, 3, 4, 6, 7, 11, 12, 13, 14, 15, 16, 17, 18, 22, 23, 24, 25, 26, 27, 37 and 42; Reactive Orange 1, 2, 4, 5, 7, 13, 14, 15, 16, 18, 20, 23 and 24; Reactive Red 1, 2, 3, 4, 5, 6, 7, 8, 11, 12, 13, 15, 16, 17, 19, 20, 21, 22, 23, 24, 28, 29, 31, 32, 33, 34, 35, 36, 37, 38, 39, 40, 41, 42, 43, 45, 46, 49, 50, 58, 59, 63 and 64; Reactive Violet 1, 2, 4, 5, 8, 9 and 10; Reactive Blue 1, 2, 3, 4, 5, 7, 8, 9, 13, 14, 15, 17, 18, 19, 20, 21, 25, 26, 27, 28, 29, 31, 32, 33, 34, 37, 38, 39, 40, 41, 43, 44 and 46; Reactive Green 5, 6, 7 and 8; Reactive Brown 1, 2, 5, 7, 8, 9, 10, 11, 14 and 16;and Reactive Black 1, 3, 4, 5, 6, 8, 9, 10, 12, 13, 14 and 18.

In preparing a solution for the present treatment, the present conjugated π-bond compound, in some cases, together with the dye or/and pigment as recited above, may be used as it is, or dissolved or dispersed in a proper solvent. It is desirable for the solution to be prepared so as to have a concentration of at least 0.01 weight %.

With respect to solvents usable for preparing the solution for the present treatment, water and various organic solvents are examples thereof.

Specific examples of such organic solvents include aliphatic hydrocarbons, such as gasoline, petroleum, benzine, mineral spirit, petroleum naphtha, V. M. & P. Naphtha, decaline, tetralin and p-cymene; aromatic hydrocarbons, such as benzene, toluene and xylene; halogenated hydrocarbons, such as trichloroethylene, perchloroethylene, chloroform, carbon tetrachloride, monobromobenzene, monochlorobenzene and dichlorobenzene; alcohols, such as amyl alcohol, ethyl alcohol, isopropyl alcohol, 2-ethylbutyl alcohol, 2-ethylhexyl alcohol, cyclohexanol, methyl alcohol, methylamyl alcohol, benzyl alcohol and butyl alcohol; ketones, such as acetone, acetonylacetone, diisobutyl ketone, diethyl ketone, dipropyl ketone, methyl amyl ketone, methylcyclohexanone, methyl dipropyl ketone, methyl ethyl ketone, methyl n-hexyl ketone, methyl idobutyl ketone and methyl propyl ketone; esters, such as acetates, butyrates, propionates and formates; alcohol esters, such as butyl lactate, isopropyl lactate, ethyl lactate, ethyl hydroxypropionate and diethyl maleate; ketone esters, such as ethyl acetoacetate and ethyl pyruvates; ethers, such as isopropyl ether, ethyl ether, diethyl carbitol, diethyl cellosolve and butyl ether; ketone alcohols, such as acetonyl methanol, diacetone alcohol, dihydroxyl acetone and pyruvinalcohol; ether alcohols, such as isopropyl cellosolve, carbitol, glycidol, cellosolve, glycol ether, benzyl cellosolve, butyl carbitol, butyl cellosolve, methyl cellosolve and triethylene glycol monoethyl ether; ketone ethers, such as acetal ethyl ether, acetonylmethanol ethyl ether and methyl ethoxyethyl ether; and ester ethers, such as butyl carbitol acetate, butyl cellosolve acetate, carbitol acetate, cellosolve acetate, 3-methoxybutyl acetate, methyl carbitol acetate and methyl cellosolve acetate.

In a case where an organic solvent highly compatible with water, such as an alcohol (e.g., methyl alcohol, ethyl alcohol, allyl alcohol, n-propyl alcohol or isopropyl alcohol), a ketone (e.g., acetone, acetonylacetone or diacetone alcohol), an ester (e.g., ethylene glycol monomethyl ether acetate, diethylene glycol methyl ether acetate or monoethyl ether acetate), an ether (e.g., dioxane, ethylene glycol monomethyl ether or ethylene glycol monoethyl ether), a furan (e.g., tetrahydrofuran or furfuryl alcohol) or an aprotic solvent (e.g., acetonitrile, N,N-dimethylformamide or N,N-dimethylacetamide), is used, water can be added in such an amount as not to check the dissolution or dispersion of the present conjugated π-bond compound, and thereby the production cost of the solution can be reduced and the safety upon transportation and storage of the solution can be elevated.

Further, the present conjugated π-bond compound can produce a more favorable result when it is used in combination with a phosphorus compound, such as hypophosphoric acid pyrophosphoric acid or polyphosphoric acid. Specifically, the treatment with a solution containing the present conjugated π-bond compound may be carried out after or before the treatment with a solution containing a phosphorus compound, or these treatments may be carried out simultaneously.

From the standpoint of producing a hydrogen absorbing alloy powder which has excellent keeping quality and easiness of handling and ensures satisfactory initial activity when used in a secondary battery, it is desirable that the treatment with a solution containing the present conjugated π-bond compound be carried out after the pulverized hydrogen absorbing alloy is treated with a mineral acid or alkali and optionally subjected to the washing and/or neutralization treatment. The washing and neutralization treatments may be carried out simultaneously. In some cases, the neutralization treatment can be an effective means to bring about improvements in battery characteristics.

The mineral acid used in the present invention is not limited to any particular ones, but it can be selected properly from known mineral acids. Preferably, the mineral acid comprising at least hydrochloric acid, sulfuric acid or nitric acid is used.

The alkali used in the present invention has no particular restriction, but it can be selected properly form known alkalis. Specifically, the alkali comprising at least lithium hydroxide, sodium hydroxide or potassium hydroxide is used to advantage. In particular, lithium hydroxide is preferred over the others.

In the treatment with a mineral acid, the suitable treatment temperature is from ordinary temperature to 130°; while, in the treatment with an alkali, the suitable treatment temperature is from ordinary temperature to 150° C., particularly from 110° C. to 130° C. The treatment may be performed under a pressure of 10 kgf/cm$^2$ or below in an airtight vessel, if needed. The treatment performed under a high temperature or while cooling is undesirable in view of economy, because it entails too high cost of equipments and facilities for the production in an industrial scale. In particular, the treatment carried out while cooling is impractical, because the treatment time becomes too long. Additionally, the treatment with an alkali under a temperature higher than 150° C. causes a drop in capacity because not only the surface part but also the interior of the alloy powder undergoes the treatment.

It is desirable that the treatment with a mineral acid be carried out for from 0.1 to 10 hours and the treatment with an alkali be carried out for from 0.5 to 20 hours. As for the treatment with the present conjugated π-bond compound, as mentioned hereinbefore, the suitable treatment time is not shorter than 10 minutes. Those treatment times are each adjusted properly so that they may be shortened when the treatment temperature is high; while they may be lengthened when the treatment temperature is low.

As for the treatment bath concentration, it is desirable that the concentration of a mineral acid be from 0.05 to 1.0N, that of an alkali be from 1.0 to 10.0N, and that of the present conjugated π-bond compound be from about 0.01 to 10 weight %, preferably from about 0.1 to 1 weight %, based on the hydrogen absorbing alloy to be treated therewith.

More specifically, it is desirable that the present conjugated π-bond compound be used in an amount of from 0.01 to 10 parts by weight per 100 parts by weight of hydrogen absorbing alloy. When the amount used is smaller than 0.01 part by weight, the treatment with the present conjugated π-bond compound has no appreciable effect; while, when the present conjugated π-bond compound is used in an amount greater than 10 parts by weight, it causes a drop in battery capacity. The treatment with the present conjugated π-bond compound is generally carried out at a temperature of from ordinary temperature to 100° C. It is undesirable to perform the treatment at a temperature higher than 100° C. or while cooling, because the treatment under such a condition not only entails too high cost of equipments and facilities for the production in an industrial scale but also produces no appreciable effect. As for the treatment time, at least 10 minutes, preferably the range of 30 minutes to 10 hours, is suitable. When the treatment time is shorter than 10 minutes, no effect is produced by the treatment.

The present invention has no particular restriction as to the way of treating a hydrogen absorbing alloy with a treating agent, but any of known ways, e.g., immersing a hydrogen absorbing alloy in a treating solution, can be adopted. Prior to the immersion, it is desirable to grind the hydrogen absorbing alloy to a powder for the purpose of effectively achieve the treatment. Preferably, the agitation is carried out during the immersion, and thereby the initial activity of the electrode using the thus treated alloy powder can be further enhanced.

The use of the hydrogen absorbing alloy treated with the present conjugated π-bond compound for the negative electrode of a nickel-hydrogen secondary battery is eminently successful in enhancing the initial activity of the secondary battery. Further, it can ensure high capacity and long life and improved low-temperature characteristic in the secondary battery. As a reason for these effects, it can be presumed that the conjugated π-bond compound having conductivity is adsorbed to the surface of a hydrogen absorbing alloy by the present treatment to bring about improvements in the foregoing characteristics.

The hydrogen absorbing alloy powder according to the present invention can be obtained in the following process; A hydrogen absorbing alloy is produced first by fusing a metallic mixture having the composition as mentioned hereinbefore by means of, e.g., a known high frequency induction furnace, the ingot thus obtained is ground to a powder, this powder is immersed in a solution containing the present conjugated π-bond compound with stirring, and then dried. Further, the electrode according to the present invention can be obtained by kneading the hydrogen absorbing alloy powder produced by the present method together with a small amount of binder to make a paste, coating the paste on the surface of a conductive support, drying the coated paste and then attaching the paste to the support surface using pressure; or forming the paste obtained above into a sheet and then pressing the sheet onto the surface of a conductive support.

In accordance with the present production method, a hydrogen absorbing alloy powder having not only high activity but also excellent keeping quality and easiness of handling can be obtained with great ease. Further, the electrode using the hydrogen absorbing allow powder obtained using the present production method acts as the negative electrode of a nickel-hydrogen secondary battery having excellent initial activity.

The present invention will now be illustrated in greater detail by reference to the following examples. However, the invention should not be construed as being limited to these examples.

EXAMPLES AND COMPARATIVE EXAMPLES

Experiment Nos. 0–18 AND 100–118

The Mish metal, Mm, constituted of 61 weight % of La, 7 weight % of Ce, 23 weight % of Pr and 9 weight % of Nd was used, and the metallic elements Mm, Al, Co Mn and Ni were weighed out in the atomic ratio of 1.00.0.30:0.75:0.20:3.75. These elements were fused under the atmosphere of argon by means of a high frequency induction furnace to give a hydrogen absorbing alloy ingot. This ingot was subjected to a heat treatment at 1020° C., and then ground to a fine powder having an average particle size of 32 μm.

The powder obtained was placed in a solution of unsaturated compound having a high degree of conjugation, which had its solution concentration in the range of 0.01 to 30 weight % and its temperature in the range of 20° to 120° C., in such an amount that the ratio between the powder and the compound was 2:1 (kg:liter), and agitated for a period of from 3 minutes to 15 hours. The resulting dispersion was filtered off, and then dried. The thus treated powder was used for an electrode, and examined for the battery characteristics to evaluate the treatment effect.

<Making Secondary Battery>

The treated powder in an amount of 2 g was mixed with 0.5 g of a 3 weight % solution of polyvinyl alcohol (polymerization degree: 200) to prepare a paste. This paste was applied to textile Ni, dried, and then subjected to pressure molding to form into a negative electrode having a thickness of 0.5 mm. Further, a sintered nickel prepared by a conventional method was used as a nickel oxide positive electrode, a nonwoven fabric of polypropylene was used as a separator, and a 6N KOH aqueous solution was used as an electrolytic solution. These were combined with the foregoing negative electrode to make an negative electrode-regulated open-type nickel-hydrogen secondary battery.

<Evaluation of Initial Activity and Initial Capacity>

The thus made battery was charged for 5 hours by sending thereto an electric current of 1,800 mA at a temperature regulated at 20° C., and then made to discharge an electric current of 120 mA until the battery voltage was dropped to 1.0 V. This charge-discharge cycle operation was repeated for 10 times. The initial activity was evaluated by the capacity measured at the first cycle, and the initial capacity was evaluated by the capacity measured at the tenth cycle. These results are shown in Table 1 together with the treatment conditions.

Furthermore, secondary batteries were made in the same manner as described above, except that the alloy powders treated as shown in Table 1 were used respectively after two months' storage, and their initial activities and initial capacities were evaluated by the same procedures as described above, thereby examining the keeping quality of each of the treated alloy powders. The evaluation results are shown in Table 2.

Additionally, the symbols in Tables 1 and 2 stand for the following compounds:

D1; Azo dye (C.I. Solvent Black 3)
DPQ; Amine-quinone condensate
D2; Azine dye (C.I. Solvent Black 5)
FE; Phenothiazine
R; Sulfonate of D1 (C.I. Solvent Black 2)

TABLE 1

| Experiment No. | Treating agent | Treating agent concentration (wt %) | Treatment temperature (°C.) | Treatment time (min) | 1st-cycle capacity (mAh/g) | 10th-cycle capacity (mAh/g) |
|---|---|---|---|---|---|---|
| 0* | none | 0 | — | — | 204 | 291 |
| 1 | D1 | 0.5 | 20 | 60 | 231 | 317 |
| 2 | D1 | 0.5 | 60 | 60 | 239 | 319 |
| 3 | D1 | 0.5 | 100 | 60 | 222 | 316 |
| 4 | D1 | 0.5 | 120 | 60 | 207 | 294 |
| 5 | DPQ | 0.5 | 60 | 60 | 237 | 318 |
| 6 | D2 | 0.5 | 60 | 60 | 242 | 320 |
| 7 | FE | 0.5 | 60 | 60 | 238 | 317 |
| 8 | R | 0.005 | 60 | 60 | 206 | 295 |
| 9 | R | 0.01 | 60 | 60 | 221 | 314 |
| 10 | R | 0.5 | 60 | 60 | 243 | 320 |
| 11 | R | 10 | 60 | 60 | 235 | 316 |
| 12 | R | 15 | 60 | 60 | 211 | 293 |
| 13 | D2/R | 0.5 | 60 | 3 | 295 | 291 |
| 14 | D2/R | 0.5 | 60 | 10 | 220 | 314 |
| 15 | D2/R | 0.5 | 60 | 60 | 241 | 321 |
| 16 | D2/R | 0.5 | 60 | 300 | 238 | 318 |
| 17 | D2/R | 0.5 | 60 | 600 | 225 | 312 |
| 18 | D2/R | 0.5 | 60 | 900 | 207 | 292 |

*:Comparative Example

TABLE 2

| Experiment No. | Treating agent | Treating agent concentration (wt %) | Treatment temperature (°C.) | Treatment time (min) | 1st-cycle capacity (mAh/g) | 10th-cycle capacity (mAh/g) |
|---|---|---|---|---|---|---|
| 100* | none | 0 | — | — | 161 | 282 |
| 101 | D1 | 0.5 | 20 | 60 | 228 | 317 |
| 102 | D1 | 0.5 | 60 | 60 | 238 | 319 |
| 103 | D1 | 0.5 | 100 | 60 | 220 | 315 |
| 104 | D1 | 0.5 | 120 | 60 | 173 | 285 |
| 105 | DPQ | 0.5. | 60 | 60 | 235 | 317 |
| 106 | D2 | 0.5 | 60 | 60 | 242 | 321 |
| 107 | FE | 0.5 | 60 | 60 | 239 | 316 |
| 108 | R | 0.005 | 60 | 60 | 179 | 283 |
| 109 | R | 0.01 | 60 | 60 | 217 | 314 |
| 110 | R | 0.5 | 60 | 60 | 241 | 321 |
| 111 | R | 10 | 60 | 60 | 226 | 314 |
| 112 | R | 15 | 60 | 60 | 180 | 284 |

TABLE 2-continued

| Experiment No. | Treating agent | Treating agent concentration (wt %) | Treatment temperature (°C.) | Treatment time (min) | 1st-cycle capacity (mAh/g) | 10th-cycle capacity (mAh/g) |
|---|---|---|---|---|---|---|
| 113 | D2/R | 0.5 | — | 3 | 166 | 282 |
| 114 | D2/R | 0.5 | 60 | 10 | 246 | 312 |
| 115 | D2/R | 0.5 | 60 | 60 | 240 | 320 |
| 116 | D2/R | 0.5 | 60 | 300 | 238 | 317 |
| 117 | D2/R | 0.5 | 60 | 600 | 227 | 313 |
| 118 | D2/R | 0.5 | 60 | 900 | 177 | 285 |

*:Comparative Example

The experimental results set forth in Table 1 demonstrate that the present treatment (namely, the treatment with a compound having at least 5 conjugated π-bonds and a molecular weight of at least 100) given to a hydrogen absorbing alloy powder was instrumental in elevating the initial activity and initial capacity of a secondary battery (especially in Experiment Nos. 2, 5–7, 10 and 15), compared with the secondary battery of Experiment No. 0.

Further, it was confirmed by the results of Experiment Nos. 8 to 12 that the present treating agent was effective when the concentration thereof was in the range of 0.01 to 10 weight %, and considerable improvements in initial activity and initial capacity were produced when the concentration was in the range of 0.1 to 1 weight %.

As for the treatment temperature, it was confirmed by the results of Experiment Nos. 1 to 4 that the treatment was ineffective when it was carried out at a temperature higher than 100° C. As a cause thereof, it is presumed that the unsaturated compound having a high degree of conjugation decomposes at elevated temperatures. With respect to the keeping quality of the hydrogen absorbing powder, it was confirmed by the data set forth in Table 2 that the secondary batteries using the hydrogen absorbing alloy powders treated in accordance with the present invention underwent no or only slight changes in their initial activity and initial capacity between before and after the storage of the alloy powder, in contrast to the comparative secondary battery using the hydrogen absorbing alloy powder undergoing no treatment.

Thus, it has been proved that the hydrogen absorbing alloy powder having excellent keeping quality can be obtained by treating a hydrogen absorbing alloy powder with a solution containing an unsaturated compound having a high degree of conjugation in a concentration of 0.01 to 10 weight % at a temperature ranging from ordinary temperature to 100° C., if needed, in an airtight vessel, and the negative electrode using the thus treated powder can have high initial activity.

Experiment Nos. 201–235 AND 301–335

A hydrogen absorbing alloy powder was prepared in the same manner as in Experiment Nos. 0 to 18, and immersed in a mineral acid solution as shown in Tables 3 and 4 with stirring under a condition as shown in Tables 3 and 4. After washing with water, the powder was immersed in a solution containing an unsaturated compound having a high degree of conjugation as shown in Tables 3 and 4, and agitated under a treating condition as shown in Tables 3 and 4. After filtration, the powder obtained was air-dried at 80° C. The thus treated powder was used for an electrode, and examined for the battery characteristics to evaluate the treatment effect.

<Making Secondary Battery>

An negative electrode-regulated open-type nickel-hydrogen secondary battery was made using the thus treated powder weighed out in an amount of 2 g in the same manner as in Experiment Nos. 0 to 18 (wherein the pre-treatment with a mineral acid was not carried out), and examined for initial activity and initial capacity by the same procedures as in Experiment Nos. 0 to 18.

The results obtained are shown in Tables 3 and 4 together with the conditions adopted in the pre-treatment and the present treatment.

Furthermore, secondary batteries were made in the same manner as described above, except that the alloy powders treated as shown in Tables 3 and 4 were used respectively after two months' storage, and their initial activities and initial capacities were evaluated by the same procedures as described above, thereby examining the keeping quality of each of the treated alloy powders. The evaluation results are shown in Tables 5 and 6.

Additionally, the symbols in Tables 3 to 6 stand for the following compounds, and Experiment No to which the mark * is attached corresponds to Comparative Example:

D1; Azo dye (C.I. Solvent Black 3)
DPQ; Amine-quinone condensate
D2; Azine dye (C.I. Solvent Black 5)
FE; Phenothiazine
R; Sulfonate of D1 (C.I. Solvent Black 2)
C; Hydrochloric acid
N; Nitric acid
S; Sulfuric acid

TABLE 3

| Experiment No. | Mineral acid | Mineral acid concentration (N) | Temperature (°C.) | Time (hr) | Treating agent | Treating agent concentration (wt %) | Treatment temperature (°C.) | Treatment time (min) | 1st-cycle capacity (mAh/g) | 10th-cycle capacity (mAh/g) |
|---|---|---|---|---|---|---|---|---|---|---|
| 0* | — | — | — | — | none | 0 | — | — | 204 | 291 |
| 201* | C | 0.15 | 60 | 0.5 | none | 0 | — | — | 219 | 290 |
| 202 | C | 0.15 | 20 | 0.5 | D1 | 0.5 | 60 | 60 | 255 | 304 |

TABLE 3-continued

| Experiment No. | Mineral acid | Mineral acid concentration (N) | Temperature (°C.) | Time (hr) | Treating agent | Treating agent concentration (wt %) | Treatment temperature (°C.) | Treatment time (min) | 1st-cycle capacity (mAh/g) | 10th-cycle capacity (mAh/g) |
|---|---|---|---|---|---|---|---|---|---|---|
| 203 | C | 0.15 | 60 | 0.5 | D1 | 0.5 | 60 | 60 | 270 | 310 |
| 204 | C | 0.15 | 130 | 0.5 | D1 | 0.5 | 60 | 60 | 260 | 307 |
| 205 | C | 0.15 | 150 | 0.5 | D1 | 0.5 | 60 | 60 | 211 | 284 |
| 206 | C | 0.15 | 60 | 0.5 | D1 | 0.5 | 20 | 60 | 257 | 307 |
| 207 | C | 0.15 | 60 | 0.5 | D1 | 0.5 | 130 | 60 | 261 | 308 |
| 208 | C | 0.15 | 60 | 0.5 | D1 | 0.5 | 150 | 60 | 221 | 281 |
| 209 | C | 0.01 | 60 | 0.5 | DPQ | 0.5 | 60 | 60 | 218 | 286 |
| 210 | C | 0.05 | 60 | 0.5 | DPQ | 0.5 | 60 | 60 | 251 | 303 |
| 211 | C | 0.15 | 60 | 0.5 | DPQ | 0.5 | 60 | 60 | 259 | 307 |
| 212 | C | 0.5 | 60 | 0.5 | DPQ | 0.5 | 60 | 60 | 265 | 306 |
| 213 | C | 1 | 60 | 0.5 | DPQ | 0.5 | 60 | 60 | 268 | 309 |
| 214 | C | 1.5 | 60 | 0.5 | DPQ | 0.5 | 60 | 60 | 214 | 279 |
| 215 | C | 0.15 | 60 | 0.5 | D2 | 0.5 | 60 | 60 | 273 | 314 |
| 216 | N | 0.15 | 60 | 0.5 | D2 | 0.5 | 60 | 60 | 256 | 304 |
| 217 | S | 0.15 | 60 | 0.5 | D2 | 0.5 | 60 | 60 | 254 | 306 |

*:Comparative Examples

TABLE 4

| Experiment No. | Mineral acid | Mineral acid concentration (N) | Temperature (°C.) | Time (hr) | Treating agent | Treating agent concentration (wt %) | Treatment temperature (°C.) | Treatment time (min) | 1st-cycle capacity (mAh/g) | 10th-cycle capacity (mAh/g) |
|---|---|---|---|---|---|---|---|---|---|---|
| 218 | C | 0.15 | 60 | 0.05 | FE | 0.5 | 60 | 60 | 208 | 284 |
| 219 | C | 0.15 | 60 | 0.1 | FE | 0.5 | 60 | 60 | 254 | 300 |
| 220 | C | 0.15 | 60 | 0.5 | FE | 0.5 | 60 | 60 | 261 | 304 |
| 221 | C | 0.15 | 60 | 1 | FE | 0.5 | 60 | 60 | 264 | 304 |
| 222 | C | 0.15 | 60 | 5 | FE | 0.5 | 60 | 60 | 266 | 306 |
| 223 | C | 0.15 | 60 | 10 | FE | 0.5 | 60 | 60 | 259 | 301 |
| 224 | C | 0.15 | 60 | 15 | FE | 0.5 | 60 | 60 | 220 | 277 |
| 225 | C | 0.15 | 60 | 0.5 | R | 0.005 | 60 | 60 | 215 | 280 |
| 226 | C | 0.15 | 60 | 0.5 | R | 0.01 | 60 | 60 | 259 | 304 |
| 227 | C | 0.15 | 60 | 0.5 | R | 0.5 | 60 | 60 | 270 | 314 |
| 228 | C | 0.15 | 60 | 0.5 | R | 10 | 60 | 60 | 263 | 308 |
| 229 | C | 0.15 | 60 | 0.5 | R | 15 | 60 | 60 | 212 | 284 |
| 230 | C | 0.15 | 60 | 0.5 | D2/R | 0.5 | 60 | 3 | 214 | 283 |
| 231 | C | 0.15 | 60 | 0.5 | D2/R | 0.5 | 60 | 10 | 256 | 308 |
| 232 | C | 0.15 | 60 | 0.5 | D2/R | 0.5 | 60 | 60 | 274 | 315 |
| 233 | C | 0.15 | 60 | 0.5 | D2/R | 0.5 | 60 | 300 | 267 | 311 |
| 234 | C | 0.15 | 60 | 0.5 | D2/R | 0.5 | 60 | 600 | 261 | 308 |
| 235 | C | 0.15 | 60 | 0.5 | D2/R | 0.5 | 60 | 900 | 214 | 289 |

TABLE 5

| Experiment No. | Mineral acid | Mineral acid concentration (N) | Temperature (°C.) | Time (hr) | Treating agent | Treating agent concentration (wt %) | Treatment temperature (°C.) | Treatment time (min) | 1st-cycle capacity (mAh/g) | 10th-cycle capacity (mAh/g) |
|---|---|---|---|---|---|---|---|---|---|---|
| 100* | — | — | — | — | none | 0 | — | — | 161 | 282 |
| 301* | C | 0.15 | 60 | 0.5 | none | 0 | — | — | 142 | 280 |
| 302 | C | 0.15 | 20 | 0.5 | D1 | 0.5 | 60 | 60 | 254 | 302 |
| 303 | C | 0.15 | 60 | 0.5 | D1 | 0.5 | 60 | 60 | 270 | 311 |
| 304 | C | 0.15 | 130 | 0.5 | D1 | 0.5 | 60 | 60 | 258 | 306 |
| 305 | C | 0.15 | 150 | 0.5 | D1 | 0.5 | 60 | 60 | 209 | 272 |
| 306 | C | 0.15 | 60 | 0.5 | D1 | 0.5 | 20 | 60 | 254 | 305 |
| 307 | C | 0.15 | 60 | 0.5 | D1 | 0.5 | W3&Th | 60 | 258 | 308 |
| 308 | C | 0.15 | 60 | 0.5 | D1 | 0.5 | 60 | 218 | 276 | |
| 309 | C | 0.01 | 60 | 0.5 | DPQ | 0.5 | 60 | 60 | 218 | 284 |
| 310 | C | 0.05 | 60 | 0.5 | DPQ | 0.5 | 60 | 60 | 251 | 303 |
| 311 | C | 0.15 | 60 | 0.5 | DPQ | 0.5 | 60 | 60 | 259 | 306 |
| 312 | C | 0.5 | 60 | 0.5 | DPQ | 0.5 | 60 | 60 | 263 | 305 |

TABLE 5-continued

| Experiment No. | Mineral acid | Mineral acid concentration (N) | Temperature (°C.) | Time (hr) | Treating agent | Treating agent concentration (wt %) | Treatment temperature (°C.) | Treatment time (min) | 1st-cycle capacity (mAh/g) | 10th-cycle capacity (mAh/g) |
|---|---|---|---|---|---|---|---|---|---|---|
| 313 | C | 1 | 60 | 0.5 | DPQ | 0.5 | 60 | 60 | 264 | 306 |
| 314 | C | 1.5 | 60 | 0.5 | DPQ | 0.5 | 60 | 60 | 212 | 278 |
| 315 | C | 0.15 | 60 | 0.5 | D2 | 0.5 | 60 | 6Q | 273 | 313 |
| 316 | N | 0.15 | 60 | 0.5 | D2 | 0.5 | 60 | 60 | 252 | 303 |
| 317 | S | 0.15 | 60 | 0.5 | D2 | 0.5 | 60 | 60 | 254 | 305 |

*:Comparative Examples

TABLE 6

| Experiment No. | Mineral acid | Mineral acid concentration (N) | Temperature (°C.) | Time (hr) | Treating agent | Treating agent concentration (wt %) | Treatment temperature (°C.) | Treatment time (min) | 1st-cycle capacity (mAh/g) | 10th-cycle capacity (mAh/g) |
|---|---|---|---|---|---|---|---|---|---|---|
| 318 | C | 0.15 | 60 | 0.05 | FE | 0.5 | 60 | 60 | 207 | 283 |
| 319 | C | 0.15 | 60 | 0.1 | FE | 0.5 | 60 | 60 | 253 | 300 |
| 320 | C | 0.15 | 60 | 0.5 | FE | 0.5 | 60 | 60 | 261 | 304 |
| 321 | C | 0.1s | 60 | 1 | FE | 0.5 | 60 | 60 | 263 | 303 |
| 322 | C | 0.15 | 60 | 5 | FE | 0.5 | 60 | 60 | 263 | 304 |
| 323 | C | 0.15 | 60 | 10 | FE | 0.5 | 60 | 60 | 258 | 301 |
| 324 | C | 0.15 | 60 | 15 | FE | 0.5 | 60 | 60 | 219 | 277 |
| 325 | C | 0.15 | 60 | 0.5 | R | 0.005 | 60 | 60 | 215 | 275 |
| 326 | C | 0.15 | 60 | 0.5 | R | 0.01 | 60 | 60 | 256 | 303 |
| 327 | C | 0.15 | 60 | 0.5 | R | 0.5 | 60 | 60 | 270 | 314 |
| 328 | C | 0.15 | 60 | 0.5 | R | 10 | 60 | 60 | 264 | 308 |
| 329 | C | 0.15 | 60 | 0.5 | R | 15 | 60 | 60 | 212 | 280 |
| 330 | C | 0.15 | 60 | 0.5 | D2/R | 0.5 | 60 | 3 | 206 | 280 |
| 331 | C | 0.15 | 60 | 0.5 | D2/R | 0.5 | 60 | 10 | 255 | 306 |
| 332 | C | 0.15 | 60 | 0.5 | D2/R | 0.5 | 60 | 60 | 274 | 314 |
| 333 | C | 0.15 | 60 | 0.5 | D2/R | 0.5 | 60 | 300 | 268 | 310 |
| 334 | C | 0.15 | 60 | 0.5 | D2/R | 0.5 | 60 | 600 | 261 | 309 |
| 335 | C | 0.15 | 60 | 0.5 | D2/R | 0.5 | 60 | 900 | 214 | 288 |

The experimental results set forth in Tables 3 and 4 demonstrate that the secondary batteries using the electrodes according to the present invention had marked improvements in initial activity and initial capacity (especially in Experiment Nos. 203, 211, 215, 220, 227 and 232), compared with the secondary batteries of Experiment Nos. 0 and 201.

On the other hand, the results of Experiment Nos. 202 to 205 indicate that the discharge capacity was lowered when the pre-treatment with a mineral acid was carried out at a temperature higher than 130° C. Further, it was confirmed by Experiment Nos. 215 to 217 that, although the most effective mineral acid was hydrochloric acid, similar effects were also produced by nitric acid and sulfuric acid.

Furthermore, it was confirmed by the results of Experiment Nos. 225 to 229 that the present unsaturated compound having a high degree of conjugation was effective when the concentration thereof was in the range of 0.01 to 10 weight %, and considerable improvements in initial activity and initial capacity were produced when the concentration was in the range of 0.1 to 1 weight %. As for the treatment temperature, it was confirmed by the results of Experiment Nos. 203 and 208 that the treatment was ineffective when it was carried out at a temperature higher than 130° C. As a cause thereof, it is presumed that the unsaturated compound having a high degree of conjugation decomposes at elevated temperatures. With respect to the keeping quality of the hydrogen absorbing powder, it was confirmed by the data set forth in Tables 5 and 6 that the secondary batteries using the electrodes prepared in accordance with the present invention underwent no or only slight changes in their initial activity and initial capacity between before and after the storage of the alloy powder, in contrast to the comparative cases.

Thus, it has been proved that the hydrogen absorbing alloy powder having excellent keeping quality and easiness of handling can be obtained by first treating a hydrogen absorbing alloy powder with a mineral acid and then treating the alloy powder with a solution containing an unsaturated compound having a high degree of conjugation, and the negative electrode using the thus treated powder can have high initial activity.

Experiment Nos. 401–436 AND 501–536

A hydrogen absorbing alloy powder was prepared in the same manner as in Experiment Nos. 0 to 18, and immersed in an alkali solution as shown in Tables 7 and 8 with stirring under a condition as shown in Tables 7 and 8. After washing with water, the powder was immersed in a solution containing an unsaturated compound having a high degree of conjugation as shown in Tables 7 and 8, and agitated under a treating condition as shown in Tables 7 and 8. After filtration, the powder obtained was air-dried at 80° C. The thus treated powder was used for an electrode, and examined for the battery characteristics to evaluate the treatment effect.

<Making Secondary Battery>

An negative electrode-regulated open-type nickel-hydrogen secondary battery was made using the thus treated powder weighed out in an amount of 2 g in the same manner as in Experiment Nos. 0 to 18 (wherein the pre-treatment with an alkali was not carried out), and examined for initial activity and initial capacity by the same procedures as in Experiment Nos. 0 to 18.

The results obtained are shown in Tables 7 and 8 together with the conditions adopted in the pre-treatment and the present treatment.

Furthermore, secondary batteries were made in the same manner as described above, except that the alloy powders treated as shown in Tables 7 and 8 were used respectively after two months' storage, and their initial activities and initial capacities were evaluated by the same procedures as described above, thereby examining the keeping quality of each of the treated alloy powders. The evaluation results are shown in Tables 9 and 10.

Additionally, the symbols in Tables 7 to 10 stand for the following compounds, and Experiment No to which the mark * is attached corresponds to Comparative Example:

D1; Azo dye (C.I. Solvent Black 3)
DPQ; Amine-quinone condensate
D2; Azine dye (C.I. Solvent Black 5)
FE; Phenothiazine
R; Sulfonate of D1 (C.I. Solvent Black 2)
K; KOH
N; NaOH
L; LiOH
K/L; KOH/LiOH=9/1

TABLE 7

| Experiment No. | Mineral acid | Mineral acid concentration (N) | Temperature (°C.) | Time (hr) | Treating agent | Treating agent concentration (wt %) | Treatment temperature (°C.) | Treatment time (min) | 1st-cycle capacity (mAh/g) | 10th-cycle capacity (mAh/g) |
|---|---|---|---|---|---|---|---|---|---|---|
| 106* | — | — | — | — | none | 0 | — | — | 204 | 291 |
| 401* | K | 6 | 110 | 5 | none | 0 | 60 | 60 | 215 | 290 |
| 402 | K | 6 | 20 | 5 | D1 | 0.5 | 60 | 60 | 255 | 308 |
| 403 | K | 6 | 60 | 5 | D1 | 0.5 | 60 | 60 | 265 | 311 |
| 404 | K | 6 | 110 | 5 | D1 | 0.5 | 60 | 60 | 269 | 313 |
| 405 | K | 6 | 150 | 5 | D1 | 0.5 | 60 | 60 | 270 | 312 |
| 406 | K | 6 | 180 | 5 | D1 | 0.5 | 60 | 60 | 219 | 279 |
| 407 | K | 6 | 110 | 5 | D1 | 0.5 | 20 | 60 | 256 | 309 |
| 408 | K | 6 | 110 | 5 | D1 | 0.5 | 130 | 60 | 258 | 312 |
| 409 | K | 6 | 110 | 5 | D1 | 0.5 | 150 | 60 | 209 | 291 |
| 410 | K | 0.1 | 110 | 5 | DPQ | 0.5 | 60 | 60 | 207 | 281 |
| 411 | K | 1 | 110 | 5 | DPQ | 0.5 | 60 | 60 | 260 | 309 |
| 412 | K | 3 | 110 | 5 | DPQ | 0.5 | 60 | 60 | 263 | 309 |
| 413 | K | 6 | 110 | 5 | DPQ | 0.5 | 60 | 60 | 266 | 310 |
| 414 | K | 10 | 110 | 5 | DPQ | 0.5 | 60 | 60 | 269 | 307 |
| 415 | K | 12 | 110 | 5 | DPQ | 0.5 | 60 | 60 | 210 | 286 |
| 416 | K | 6 | 110 | 5 | D2 | 0.5 | 60 | 60 | 263 | 309 |
| 417 | N | 6 | 110 | 5 | D2 | 0.5 | 60 | 60 | 260 | 306 |
| 418 | L | 6 | 110 | 5 | D2 | 0.5 | 60 | 60 | 251 | 302 |
| 419 | K/L | 6 | 110 | 5 | D2 | 0.5 | 60 | 60 | 266 | 311 |

*:Comparative Examples

TABLE 8

| Experiment No. | Alkali | Alkali concentration (N) | Temperature (°C.) | Time (hr) | Treating agent | Treating agent concentration (wt %) | Treatment temperature (°C.) | Treatment time (min) | 1st-cycle capacity (mAh/g) | 10th-cycle capacity (mAh/g) |
|---|---|---|---|---|---|---|---|---|---|---|
| 420 | K | 6 | 110 | 3 | FE | 0.5 | 60 | 60 | 206 | 280 |
| 421 | K | 6 | 110 | 10 | FE | 0.5 | 60 | 60 | 250 | 302 |
| 422 | K | 6 | 110 | 60 | FE | 0.5 | 60 | 60 | 250 | 304 |
| 423 | K | 6 | 110 | 300 | FE | 0.5 | 60 | 60 | 252 | 309 |
| 424 | K | 6 | 110 | 600 | FE | 0.5 | 60 | 60 | 253 | 308 |
| 425 | K | 6 | 110 | 900 | FE | 0.5 | 60 | 60 | 218 | 289 |
| 426 | K | 6 | 110 | 300 | R | 0.005 | 60 | 60 | 210 | 289 |
| 427 | K | 6 | 110 | 300 | R | 0.01 | 60 | 60 | 259 | 308 |
| 428 | K | 6 | 110 | 300 | R | 0.5 | 60 | 60 | 268 | 308 |
| 429 | K | 6 | 110 | 300 | R | 10 | 60 | 60 | 264 | 307 |
| 430 | K | 6 | 110 | 300 | R | 15 | 60 | 60 | 208 | 288 |
| 431 | K | 1 | 110 | 300 | D2/R | 0.5 | 60 | 3 | 212 | 287 |
| 432 | K | 3 | 110 | 300 | D2/R | 0.5 | 60 | 10 | 255 | 305 |
| 433 | K | 6 | 110 | 300 | D2/R | 0.5 | 60 | 60 | 270 | 311 |
| 434 | K | 10 | 110 | 300 | D2/R | 0.5 | 60 | 300 | 268 | 308 |
| 435 | K | 12 | 110 | 300 | D2/R | 0.5 | 60 | 600 | 260 | 305 |
| 436 | K | 6 | 110 | 300 | D2/R | 0.5 | 60 | 900 | 210 | 290 |

TABLE 9

| Experiment No. | Alkali | Alkali concentration (N) | Temperature (°C.) | Time (hr) | Treating agent | Treating agent concentration (wt %) | Treatment temperature (°C.) | Treatment time (min) | 1st-cycle capacity (mAh/g) | 10th-cycle capacity (mAh/g) |
|---|---|---|---|---|---|---|---|---|---|---|
| 100* | — | — | — | — | none | 0 | — | — | 161 | 282 |
| 501* | K | 6 | 110 | 5 | none | 0 | — | — | 158 | |
| 502 | K | 6 | 20 | 5 | D1 | 0.5 | 60 | 60 | 255 | 367 |
| 503 | K | 6 | 60 | 5 | D1 | 0.5 | 60 | 60 | 265 | 311 |
| 504 | K | 6 | 110 | 5 | D1 | 0.5 | 60 | 60 | 268 | 312 |
| 505 | K | 6 | 150 | 5 | D1 | 0.5 | 60 | 60 | 268 | 312 |
| 506 | K | 6 | 180 | 5 | D1 | 0.5 | 60 | 60 | 476 | 269 |
| 507 | K | 6 | 110 | 5 | D1 | 0.5 | 20— | 60— | 254 | 308 |
| 508 | K | 6 | 110 | 5 | D1 | 0.5 | 130 | 60 | 257 | 310 |
| 509 | K | 6 | 110 | 5 | D1 | 0.5 | 150 | 60 | 180 | 288 |
| 510 | K | 0.1 | 110 | 5 | DPQ | 0.5 | 60 | 60 | 201 | 277 |
| 511 | K | 1 | 110 | 5 | DPQ | 0.5 | 60 | 60 | 261 | 308 |
| 512 | K | 3 | 110 | 5 | DPQ | 0.5 | 60 | 60 | 262 | 309 |
| 513 | K | 6 | 110 | 5 | DPQ | 0.5 | 60 | 60 | 265 | 309 |
| 514 | K | 10 | 110 | 5 | DPQ | 0.5 | 60 | 60 | 266 | 305 |
| 515 | K | 12 | 110 | 5 | DPQ | 0.5 | 60 | 60 | 199 | 280 |
| 516 | K | 6 | 110 | 5 | D2 | 0.5 | 60 | 60 | 262 | 309 |
| 517 | N | 6 | 110 | 5 | D2 | 0.5 | 60 | 60 | 260 | 306 |
| 518 | L | 6 | 110 | 5 | D2 | 0.5 | 60 | 60 | 250 | 302 |
| 519 | K/L | 6 | 110 | 5 | D2 | 0.5 | 60 | 60 | 264 | 310 |

*:Comparative Examples

TABLE 10

| Experiment No. | Alkali | Alkali concentration (N) | Temperature (°C.) | Time (hr) | Treating agent | Treating agent concentration (wt %) | Treatment temperature (°C.) | Treatment time (min) | 1st-cycle capacity (mAh/g) | 10th-cycle capacity (mAh/g) |
|---|---|---|---|---|---|---|---|---|---|---|
| 520 | K | 6 | 110 | 3 | FE | 0.5 | 60 | 60 | 188 | 276 |
| 521 | K | 6 | 110 | 10 | FE | 0.5 | 60 | 60 | 250 | 301 |
| 522 | K | 6 | 1i0 | 60 | FE | 0.5 | 60 | 60 | 250 | 302 |
| 523 | K | 6 | 110 | 300 | FE | 0.5 | 60 | 60 | 252 | 308 |
| 524 | K | 6 | 110 | 600 | FE | 0.5 | 60 | 60 | 252 | 307 |
| 525 | K | 6 | 110 | 900 | FE | 0.5 | 60 | 60 | 208 | 287 |
| 526 | K | 6 | 110 | 300 | R | 0.005 | 60 | 60 | 160 | 276 |
| 527 | K | 6 | 110 | 300 | R | 0.01 | 60 | 60 | 255 | 303 |
| 528 | K | 6 | 110 | 300 | R | 0.5 | 60 | 60 | 268 | 308 |
| 529 | K | 6 | 110 | 300 | R | 10 | 60 | 60 | 265 | 307 |
| 530 | K | 6 | 110 | 300 | R | 15 | 60 | 60 | 208 | 277 |
| 531 | K | 6 | 110 | 300 | D2/R | 0.5 | 60 | 3 | 185 | 280 |
| 532 | K | 6 | 110 | 300 | D2/R | 0.5 | 60 | 10 | 254 | 305 |
| 533 | K | 6 | 110 | 300 | D2/R | 0.5 | 60 | 60 | 270 | 311 |
| 534 | K | 6 | 110 | 300 | D2/R | 0.5 | 60 | 300 | 268 | 309 |
| 535 | K | 6 | 110 | 300 | D2/R | 0.5 | 60 | 600 | 259 | 304 |
| 536 | K | 6 | 110 | 300 | D2/R | 0.5 | 60 | 900 | 201 | 278 |

The experimental results set forth in Tables 7 and 8 demonstrate that the secondary batteries using the electrodes according to the present invention (namely, the electrodes using hydrogen absorbing alloy powders treated first with a 1–10N alkali and then with a solution containing the present compound having at least 5 conjugated π-bonds and a molecular weight of at least 100) had marked improvements in initial activity and initial capacity (especially in Experiment Nos. 403, 413, 416, 423, 428 and 433), compared with the secondary batteries of Experiment Nos. 100 and 401.

In addition, the results of Experiment Nos. 410 to 415 indicate that the alkali concentration ranging from 1to 10N is effective in producing improvements in battery characteristics; while the results of Experiment Nos. 402 to 406 indicate that the discharge capacity was lowered when the pre-treatment with an alkali was carried out at a temperature higher than 150° C. Further, it was confirmed by Experiment Nos. 416 to 419 that not only the independent use of potassium hydroxide, sodium hydroxide and lithium hydroxide but also combined use thereof were effective.

Furthermore, it was confirmed by the results of Experiment Nos. 426 to 430 that the present unsaturated compound having a high degree of conjugation was effective when the concentration thereof was in the range of 0.01 to 10 weight %, and considerable improvements in initial activity and initial capacity were produced when the concentration was in the range of 0.1 to 1 weight %. As for the treatment temperature, it was confirmed by the results of Experiment Nos. 404 and 409 that the treatment was ineffective when it was carried out at a temperature higher than 130° C. As a cause thereof, it is presumed that the unsaturated compound having a high degree of conjugation decomposes at elevated temperatures.

With respect to the keeping quality of the hydrogen absorbing powder, it was confirmed by the data set forth in Tables 9 and 10 that the secondary batteries using the electrodes prepared in accordance with the present invention underwent no or only slight changes in their initial activity and initial capacity between before and after the storage of the alloy powder, in contrast to the comparative cases.

Thus, it has been proved that the hydrogen absorbing alloy powder having excellent keeping quality and ensuring high initial activity in a secondary battery can be obtained by first treating a hydrogen absorbing alloy powder with an alkali and then treating the alloy powder with a solution containing the present unsaturated compound in a concentration of 0.01 to 10 weight % at a temperature ranging from ordinary temperature to 130° C.

What is claimed is:

1. A method of producing a hydrogen absorbing alloy powder, comprising treating a pulverized hydrogen absorbing alloy with a solution comprising a conjugated unsaturated compound having at least 5 conjugated $\pi$ bonds and a molecular weight of at least 100.

2. A method of producing a hydrogen absorbing alloy powder in accordance with claim 1, wherein the pulverized hydrogen absorbing alloy has a composition represented by $(La)_xR_{1-x}(NiM)_y$ wherein R is at least one rare earth element selected from a group consisting of Ce, Pr and Nd, M is at least one metallic element selected from a group consisting of Mn, Al, Co, Ti, Fe and Zr, x is from 0.2 to 1 and y is from 4.0 to 6.0.

3. A method of producing a hydrogen absorbing alloy powder in accordance with claim 1, further comprising treating the pulverized hydrogen absorbing alloy with a mineral acid or an alkali before the pulverized hydrogen absorbing alloy is treated with the solution comprising the conjugated unsaturated compound.

4. A method of producing a hydrogen absorbing alloy powder in accordance with claim 2, further comprising treating a pulverized hydrogen absorbing alloy with a mineral acid or an alkali before the pulverized hydrogen absorbing alloy is treated with the solution comprising the conjugated unsaturated compound.

5. A method of producing a hydrogen absorbing alloy powder in accordance with claim 1, wherein the molecular weight of said conjugated unsaturated compound is at least 200.

6. A method of producing a hydrogen absorbing alloy powder in accordance with claim 1, wherein said treatment with the conjugated unsaturated compound is carried out at a temperature of from ordinary temperature to 100° C.

7. A method of producing a hydrogen absorbing alloy powder in accordance with claim 1, wherein said conjugated unsaturated compound is used in an amount of 0.01 to 10 parts by weight per 100 parts by weight of the pulverized hydrogen absorbing alloy.

8. A method of producing a hydrogen absorbing alloy powder in accordance with claim 3, wherein the mineral acid is at least one acid selected from the group consisting of hydrochloric acid, sulfuric acid and nitric acid.

9. A method of producing a hydrogen absorbing alloy powder in accordance with claim 3, wherein the mineral acid concentration is from 0.05N to 1.0N.

10. A method of producing a hydrogen absorbing alloy powder in accordance with claim 3, wherein the alkali is at least one hydroxide selected from the group consisting of lithium hydroxide, sodium hydroxide and potassium hydroxide.

11. A method of producing a hydrogen absorbing alloy powder in accordance with claim 3, wherein the alkali concentration is from 1.0N to 10.0N.

12. A method of producing a hydrogen absorbing alloy powder in accordance with claim 3, wherein the treatment of the pulverized hydrogen absorbing alloy with a mineral acid is carried out at a temperature of from ordinary temperature to 130° C.

13. A method of producing a hydrogen absorbing allow powder in accordance with claim 3, wherein the treatment of the pulverized hydrogen absorbing alloy with a mineral acid is carried out at a temperature of from ordinary temperature to 150° C.

14. In an electrode using a hydrogen absorbing alloy, the improvement wherein the alloy is a powder produced by a process comprising treating a pulverized hydrogen absorbing alloy with a solution comprising a conjugated unsaturated compound having at least 5 conjugated Π bonds and a molecular weight of at least 100.

15. An electrode using a hydrogen absorbing alloy powder according to claim 14, wherein the pulverized hydrogen absorbing alloy has a composition represented by $(La)_xR_{1-x}(NiM)_y$ wherein R is at least one rare earth element selected from Ce, Pr or Nd, M is at least one metallic element which is Mn, Al, Co, Ti, Fe or Zr, x is 0.2 to 1 and y is 4.0 to 6.0.

16. An electrode using a hydrogen absorbing alloy powder according to claim 14, produced by a process further comprising treating the pulverized hydrogen absorbing alloy with a mineral acid or an alkali before the pulverized hydrogen absorbing alloy is treated with the solution comprising the conjugated unsaturated compound.

17. An electrode using a hydrogen absorbing alloy powder according to claim 14, produced by a process wherein said treatment with the conjugated unsaturated compound is carried out a temperature of from ordinary temperature to 100° C.

18. A hydrogen absorbing alloy produced by a process comprising treating a pulverized hydrogen absorbing alloy with a solution comprising a conjugated unsaturated compound having at least 5 conjugated Π bonds and a molecular weight of at least 100.

19. A hydrogen absorbing alloy according to claim 18, wherein the pulverized hydrogen absorbing alloy has a composition represented by $(La)_xR_{1-x}(NiM)_y$ wherein R is at least one rare earth element which is Ce, Pr or Nd, M is at least one metallic element which is Mn, Al, Co, Ti, Fe or Zr, x is from 0.2 to 1 and y is from 4.0 to 6.0.

* * * * *